United States Patent [19]
Saito et al.

[11] Patent Number: 5,519,556
[45] Date of Patent: May 21, 1996

[54] MAGNETIC HEAD HAVING SEPARATE FUSION GLASS AND LAMINATING GLASS WITH A TRACK ADJUSTMENT GROOVE IN A MAGNETIC CORE BLOCK

[75] Inventors: Tadashi Saito; Shinji Takahashi; Toshinobu Watanabe, all of Miyagi, Japan

[73] Assignee: Sony Corporation, Tokyo, Japan

[21] Appl. No.: 164,793

[22] Filed: Dec. 10, 1993

[30] Foreign Application Priority Data

Dec. 14, 1992 [JP] Japan .................... 4-352819

[51] Int. Cl.$^6$ .............. G11B 5/23; G11B 5/133
[52] U.S. Cl. .......... 360/125; 360/126; 360/119; 428/692
[58] Field of Search ................. 360/103, 119, 360/120, 125, 126; 428/432, 433, 692, 694 R; 501/22, 45, 46, 48

[56] References Cited

U.S. PATENT DOCUMENTS

| | | | |
|---|---|---|---|
| 4,894,742 | 1/1990 | Saito et al. | 360/126 |
| 4,901,179 | 2/1990 | Satomi et al. | 360/126 |
| 5,034,285 | 7/1991 | Satomi et al. | 360/125 |
| 5,222,006 | 6/1993 | Yanagi | 360/126 |
| 5,245,488 | 9/1993 | Iwamoto et al. | 360/103 |
| 5,247,415 | 9/1993 | Kumasaka et al. | 360/126 |
| 5,262,915 | 11/1993 | Terunuma et al. | 360/120 |
| 5,273,948 | 12/1993 | Yamazaki et al. | 360/119 |
| 5,386,332 | 1/1995 | Jagielinski et al. | 428/692 |

FOREIGN PATENT DOCUMENTS

| | | |
|---|---|---|
| 0197532A3 | 10/1986 | European Pat. Off. . |
| 0356155A3 | 2/1990 | European Pat. Off. . |
| 63-74103 | 4/1988 | Japan .................... 360/125 |

OTHER PUBLICATIONS

Japanese Patent Abstract JP61057024, Mar. 22, 1986, vol. 10, No. 220.

Japanese Patent Abstract JP1227207, Nov. 09, 1989, vol. 13, No. 547.

Japanese Patent Abstract JP63045147, Feb. 26, 1988, vol. 12, No. 258.

Japanese Patent Abstract JP3012805, Jan. 21, 1991, vol. 15, No. 127.

Japanese Patent Abstract JP2035619, Feb. 06, 1990, vol. 14, No. 191.

Primary Examiner—Stuart S. Levy
Assistant Examiner—Jefferson Evans
Attorney, Agent, or Firm—Hill, Steadman & Simpson

[57] ABSTRACT

A magnetic head capable of preventing erosion of the magnetic metal film despite the absence of a protective film and preventing a decrease in the playback output due to decrease of the track width while preventing cracking from being initiated and developed in the ferrite substrate is disclosed. The magnetic head is prepared by forming magnetic core half blocks and by bonding the core half blocks via gap bonding, each of the magnetic core half blocks being previously formed by stacking a ferrite substrate on another ferrite substrate having magnetic metal films via glass films and forming track width adjustment grooves. The glass transition temperature Tg of the glass employed for stacking the ferrite substrates is set so as to be higher than the glass yield point Tc of the fusion glass.

2 Claims, 25 Drawing Sheets

MAGNETIC HEAD HAVING SEPARATE FUSION GLASS AND LAMINATING GLASS WITH A TRACK ADJUSTMENT GROOVE IN A MAGNETIC CORE BLOCK

BACKGROUND OF THE INVENTION

1. Field of the Invention

This invention relates to a magnetic head for a video tape recorder. More particularly, it relates to the use of fusion glass for laminating ferrite substrates and inserting fusion glass in a track width adjustment groove by way of gap bonding.

2. Related Art

In the field of magnetic recording, a laminated metal film head, comprising a lamination of plural layers of thin magnetic metal films with the interposition of insulating layers, has been examined as a magnetic head for high density magnetic recording having excellent high-frequency characteristics.

Such a magnetic head is shown for example in FIG. 29, in which plural magnetic metal thin films of reduced film thicknesses are stacked via insulating films and sandwiched in their entirety by a pair of magnetic core substrates 103, 104 and 105, 106 to form magnetic core halves 107, 108 which abut each other at the end faces of the stacked metal films 101, 102 and are fused to each other by fusion glass 109. In general, since the combined film thicknesses of the stacked metal films are set so as to be equal to a track width TW of a magnetic gap g, the magnetic core substrates 103, 104; 105, 106 are formed of a non-magnetic material, such as crystallized glass or ceramics.

However, if, with such magnetic head, the track width TW is reduced for achieving a higher recording density, the head efficiency is lowered, as shown in FIG. 30, due to the decreased core cross-sectional area of the laminated metal films 101, 102.

For this reason, it has been proposed to employ an oxide magnetic material, such as ferrite, in the magnetic core substrates 103, 104; 105, 106 for maintaining the cross-sectional area of the core to preventing the head efficiency from being decreased.

In such case, it is possible with the magnetic head employing the ferrite substrate to prevent the head playback output from being lowered due to the deterioration in the head efficiency as compared to the magnetic head employing the non-magnetic substrate, as shown in FIGS. 31 to 33. Such effect becomes outstanding if the track width is reduced to an extremely small value of, for example 5 µm.

A magnetic head in which ferrite is used in the magnetic core substrates 103, 104; 105, 106 is produced by the following sequence of operations.

First, the portion on a major surface 110a of a ferrite substrate 110 which is to become a magnetic gap and its adjacent area is machined to form a substantially U-shaped groove 111 along the entire length of the substrate 110, as shown in FIG. 34.

A glass 112 as a non-magnetic material is inserted in the groove 111, as shown in FIG. 35.

The portion of the glass which has overflown the groove 111 is ground off smooth until the major surface 110a of the ferrite substrate 110 is exposed in its entirety, and subsequently the ground surface is machined to a mirror surface finish.

Magnetic metal thin films having reduced film thicknesses are stacked on the major surface 110a and finished to a mirror surface, for forming a laminated metal film 113.

A glass film 114 is formed on the laminated metal film 113, such as by sputtering, so that a ferrite substrate as later explained may be subsequently bonded thereon.

Then, as shown in FIG. 38, another ferrite substrate 115, prepared in a similar manner with the same shape, is stacked on the glass film 114, so that the ferrite substrates 110, 115 are bonded to each other by the glass film 114 to form a unitary block 116.

The block 116 is then severed along the centerline of the groove 116 filled with the glass 112 into magnetic core half-blocks 117, 118.

Then, as shown in FIG. 39, winding grooves 119, 120 for placing coils, not shown, and glass grooves 121, 122, are formed in the magnetic core half-blocks 117, 118.

The surfaces of these magnetic core half-blocks 117, 118 which later form the magnetic gap are machined to a mirror surface finish and a gap film is formed on the magnetic gap forming surfaces.

Then, as shown in FIG. 40, the magnetic core half-blocks 117, 118 are bonded to each other by a fusion glass 123 to form a unitary block.

Then, auxiliary winding grooves 124, 125 are formed in the unitary block and a surface along which slides a magnetic recording medium is ground to a cylindrical surface.

Finally, the assembly is cut to a required size to complete a magnetic head shown in FIG. 41.

With the above-described production method, not only is the process from FIG. 34 to FIG. 36 for controlling the track width complex, but a step difference is produced between the level of the glass 112 inserted in the groove 111 formed in the ferrite substrate 110 and that of the ferrite substrate 110 shown in FIG. 36, thus adversely affecting the characteristics of a sputtered magnetic metal film.

That is, when mirror-surface finishing a forming surface 110a for the laminated metal film 113, a step difference H is generated due to difference in hardness between the glass and the ferrite substrate. The step difference may be on the order of 20 to 30 nm. If the thin magnetic metal film is laminated via an insulating film on the surface presenting the step difference H, the magnetic film continuity is lost and deteriorates the magnetic characteristics of the laminated metal film 113.

According to a conventional practice for overcoming such deficiency, a plurality of thin magnetic metal thin films are laminated via insulating layers on the ferrite substrate not formed with a groove and a glass film is formed thereon. After bonding to a ferrite substrate, not formed with the groove, the assembly is split into two along a surface which is to become a magnetic gap, and a track width adjustment groove is machined in the ferrite substrate.

After forming winding grooves and glass grooves in the ferrite substrate, the ferrite substrates formed with the winding grooves and the glass grooves are abutted to each other with a gap film in-between, and fusion glass is inserted into the track width adjustment groove. The resulting assembly is ground to a cylinder which is then cut into pre-set chips for completing magnetic heads.

Although the production process may be simplified with the above-described method for producing the magnetic heads to prevent deterioration of magnetic properties of the laminated metal film, the laminated metal film tends to be eroded by the fused glass inserted into the track width adjustment groove which decreases the effective track width and lowers the playback output.

Thus it may be contemplated to form protective films 137, 138 formed of a material which is substantially not eroded by the fusion glass 136, inserted into the track width adjustment grooves 134, 135 formed in the magnetic core halves 132, 133, produced by stacking the ferrite substrates 129, 131 formed with the laminated metal films 126, 127 on the ferrite substrates 128, 130 with the interposition of glass films 140, 141, such as metal films of Cr, Ti, Zr or Ta, or metal oxides, such as $Cr_2O_3$, $TiO_2$, $ZrO_2$, $Ta_2O_5$, on the laminated metal films 126, 127 contacted with the fusion glass 136, as shown in FIG. 44.

However, since the material of the protective films 137, 138 exhibits a high abrasion resistance during the sliding of the tape as compared to the laminated metal films 126, 127, fusion glass 136 or the ferrite substrates 128, 129, 130 and 131, the protective films 137, 138 are protruded with the head wear as shown in FIG. 45. If the magnetic tape 139 is run in this state to reproduce the magnetic signals, a spacing loss corresponding to the protrusion S of the protective films 137, 138 is produced to lower the playback output, as shown in FIG. 46. If the magnetic head is produced by the above method, the fusion glass 136 inserted in the fluid state in the track width adjustment grooves 134, 135 during fusion tends to be cracked to lower the gap length accuracy significantly. On the other hand, if the heating temperature employed when laminating the ferrite substrates 128, 129, 130, 131 after formation of the laminated metal films 126, 127 is raised excessively, not only are the film characteristics of the laminated metal films 126, 127 lowered significantly, but the ferrite substrates 129, 131 undergo cracking due to the difference in the thermal expansion coefficients between the laminated metal films 126, 127 and the ferrite substrates 129, 131.

Also, as for the glass films 140, 141, the strength of ferrite is lowered at the contact area between the ferrite substrate and the glass film due to the reaction between the ferrite and the glass during heating intended for laminating the ferrite substrates, thus leading to a fracture 142 as shown in FIG. 47 in the course of the various machining operations following the lamination of the substrates. Besides, bubbles 143 are generated within the glass films due to the reaction between the ferrite and the glass and powders worn off from the magnetic recording medium, such as the magnetic tape, tend to be deposited in the bubbles 143 to cause the clogging of the magnetic head.

OBJECTS AND SUMMARY OF THE INVENTION

In view of the above-described status of the prior art, it is an object of the present invention to provide a highly reliable magnetic head which renders it possible to prevent the erosion of the magnetic metal film despite the absence of the protective film and to suppress the lowering of the playback output due to the decreased track width.

It is another object of the present invention to provide a magnetic head which renders it possible to suppress the generation of cracks in the fusion glass or the ferrite substrate and to prevent the reaction between the glass films and the ferrite substrates to suppress the fracture of the ferrite or the generation of bubbles in the glass films.

It is yet another object of the present invention to provide a magnetic head which renders it possible to improve the output and to achieve satisfactory recording and/or reproduction on or from the high recording density magnetic recording medium, even if the track width is reduced.

According to the present invention, there is provided a magnetic head prepared by forming magnetic core half blocks and by bonding the core half blocks by gap bonding, each of the magnetic core half blocks being previously formed by stacking a ferrite substrate on another ferrite substrate having magnetic metal films formed thereon via a glass film and forming a track width adjustment groove therein, wherein the glass transition temperature Tg of the glass employed for stacking the ferrite substrates is set so as to be higher than the glass yield point Tc of the fusion glass.

The glass employed for stacking the ferrite substrates has a glass transition temperature Tg of not lower than 450° C. and a glass yield point of not higher than 650° C.

The fusion glass at an arbitrary temperature within a temperature range of not lower than 500° C. and not higher than 600° C. has a viscosity of not lower than $10^3$ Pa.s or a viscosity of not higher than $10^4$ Pa.s, said fusion glass during fusion having a viscosity of not lower than $10^4$ Pa.s.

The fusion glass is a PbO based low-melting glass.

The track width is not larger than 15 μm.

An interfacing film formed of a high-melting non-magnetic metal film or an oxide material is interposed between the glass employed for the ferrite substrate and the ferrite substrate.

The glass transition temperature Tg and the glass yield point Tc are first explained.

The glass transition temperature Tg and the glass yield point Tc are found from a thermal expansion curve for glass shown in FIG. 4. The thermal expansion curve is found from the temperature and the elongation percentage. The elongation percentage is the ratio of an elongation ΔL of a sample T produced up to a temperature t higher than a standard temperature, generally room temperature, to a length $L_0$ at the standard temperature. That is, the elongation percentage=$(\Delta L/L_0) \times 100$ (%). In the thermal expansion curve, a temperature at which the elongation percentage shows a rapid rise in the glass transition temperature Tg and a temperature at which the elongation percentage reaches a maximum value is the glass yield point Tc.

It is noted that, if the glass yield point Tc of the fusion glass employed for gap bonding is higher than the glass transition point Tg of the glass employed for stacking ferrite substrates, the fusion glass undergoes cracking under the following mechanism.

After the fusion glass has started to be solidified and before the glass employed for stacking the substrates is solidified, the movement of the magnetic metal film on lines A–A' and B–B' of a magnetic core half block 201, abutted on another magnetic core half block via a magnetic gap g as shown in FIG. 5, is considered from the viewpoint of thermal expansion or contraction.

The magnetic core half block 201 is prepared by bonding a ferrite substrate 203 having a magnetic metal film 202 formed thereon to another ferrite substrate 203 not having a magnetic metal film 202 formed thereon by a sputtered glass film 205 and forming track width adjustment grooves 206 and glass grooves therein. Another magnetic core half block, not shown, prepared in a similar manner, is bonded to the magnetic core half block 201 by a fusion glass 207 by gap bonding.

If the glass yield point of the fusion glass is Tcw, the glass transition temperature of the sputtered glass film 205 is Tgs, the thermal expansion coefficient of the ferrite substrates

203, 204 is af, the thermal expansion coefficient of the magnetic metal film 202 is am and the length of the magnetic core half block 201 in the tape sliding direction is L, since the glass yield point Tcw of the fusion glass 207 is higher than the glass transition point Tgs of the sputtered glass film 205 (Tcw>Tgs), the movement of the magnetic metal film 205 occurring since the start of setting of the fusion glass 207 at the glass yield point Tcw until complete setting of the glass of the sputtered glass film 205 at the glass transition point Tgs, as considered from the aspect of the thermal expansion or contraction, is a contracting movement, and the amounts of contraction of the magnetic metal film 202 on the lines A–A' and B–B' may be defined in the following manner.

That is, the amount of contraction $\Delta a$ of the magnetic metal film 202 on the line A–A' is given by $\Delta a \approx L \times af \times (Tcw-Tgs)$. The reason the thermal expansion coefficient af is employed is that the magnetic metal film 202 on the line A–A' is strongly bonded to the ferrite substrate 203 such as by sputtering and, since (thickness of the ferrite substrate 203)>>(film thickness of the magnetic metal film 202), the movement of the film 202 is determined by the thermal expansion coefficient of ferrite.

On the other hand, the amount of contraction $\Delta b$ of the magnetic metal film 202 on the line B–B' is given by $\Delta b = L \times am \times (Tcw-Tgs)$. Since the magnetic metal film 202 on the line B–B' is not influenced by the movement of the ferrite substrate 204 until complete setting of the glass of the sputtered glass 205, the magnetic metal film 202 on the line B–B' is contracted in accordance with the thermal expansion coefficient of the magnetic metal film 202.

In general, since the thermal expansion coefficient am of the magnetic metal film 202 is larger than the thermal expansion coefficient af of the ferrite substrates 203, 204 (am>af), the amount of contraction on the line B–B' becomes dominant. As a result thereof, a force F is generated which acts on the magnetic gap g formed on the abutment surfaces of the magnetic core halves 201, 208 in a direction of opening the magnetic gap g apart as shown in FIG. 6. By such stress F, the fusion glass 207 on the line B–B' first undergoes cracking which is then grown into the fusion glass 207 on the line A–A' via the magnetic gap g.

In order to prevent this from occurring, it suffices if the glass of the sputtered glass film 205 is completely set before the glass of the sputtered glass 205 is fully set so that the movement of the magnetic metal film 202 on the line B–B' is restrained by the ferrite substrate 204. That is, it is necessary for the glass transition temperature Tg of the glass of the sputtered glass 205 to be higher than the glass yield point of the fusion glass 207.

In light of the foregoing, the glass transition point Tg of the glass employed for stacking of the ferrite substrates is set so as to be higher than the glass yield point Tc of the fusion glass, so that there is no risk of cracking developed in the fusion glass employed for gap bonding.

With the magnetic head according to the present invention, by employing the glass having the glass transition temperature Tg of not lower than 450° C. and the glass yield point Tc of not higher than 650° C. for stacking the ferrite substrates, it becomes possible to suppress cracking in the ferrite substrate during stacking of the substrates and to employ the high reliability fusion glass during the gap bonding without the risk of cracking.

Besides, with the magnetic head according to the present invention, since the fusion glass at an arbitrary temperature within a temperature range of not lower than 500° C. and not higher than 600° C. is a PbO based low melting glass having a viscosity of not lower than $10^3$ Pa.s or a viscosity of not higher than $10^4$ Pa.s, while the fusion glass during fusion has a viscosity of not lower than $10^4$ Pa.s, it becomes possible to inhibit erosion of the magnetic metal film by the fusion glass despite the absence of the protective film between the magnetic metal film and the fusion glass and hence to prevent the decrease in the playback output from being lowered due to the decreased track width of the magnetic gap.

In addition, since the track width of the magnetic head is not decreased even with the track width of not higher than 15 μm, the playback output is not deteriorated to enable high density recording.

On the other hand, since the magnetic head according to the present invention includes an interfacing film composed of a high melting non-magnetic metal film or an oxide material between the ferrite substrate and the glass employed for stacking the ferrite substrates, the ferrite substrate is not deteriorated in strength nor are bubbles generated in the glass film due to the reaction between the ferrite and the glass during heating intended for stacking the ferrite substrates.

In sum, with the magnetic head according to the present invention, since the glass transition temperature of the glass employed for stacking the ferrite substrates is set so as to be higher than the glass yield point, of the fusion glass employed for gap bonding, it becomes possible to prevent cracking from being developed in the fusion glass to achieve high accuracy in the gap length of the magnetic gap.

Also, with the magnetic head according to the present invent, ion, since the glass employed for stacking the ferrite substrates has the glass transit, ion temperature Tg of not lower than 450° C. and the glass yield points Tc of not higher than 650° C., cracking may be prevented from being developed in the ferrite substrate on heating intended for stacking the substrates so that high reliability fusion glass may be employed during gap bonding without cracking to improve the reliability of the magnetic head significantly.

Besides, with the magnetic head according to the present invention, since the PbO based low-melting glass is employed as the fusion glass for gap bonding, and the viscosity of the glass being inserted is set so as to be not less than $10^4$ Pa.s, it becomes possible t,o prevent erosion of the metal film by the fusion glass to inhibit the decrease in the track width. Consequently, the decrease in the playback output due to the decrease in the track width may be reduced to not more than 0.1 dB even with the magnetic head having an extremely narrow track width of not larger than 15 μm. Thus the magnetic head according to the present invention enables recording/reproduction under optimum conditions on or from high density recording media.

In addition, since an interfacing film composed of the high melting non-magnetic metal material or an oxide material is provided between the ferrite substrate and the glass employed for stacking the ferrite substrates, the ferrite is not lowered in strength due to reaction between the glass and the ferrite, while fractures are not incurred internally of the ferrite. Since no bubbles are generated in the glass film due to reaction with the ferrite, there is no risk of powders becoming worn off from the magnetic recording medium, such as the magnetic tape, and being accumulated in the bubbles. Consequently, there is no risk of magnetic head clogging to improve the reliability of the magnetic head significantly.

BRIEF DESCRIPTION OF THE DRAWINGS

FIGS. 28(a) and 28(b) show a further modification of the magnetic head in which the magnetic metal films are formed in a direction not parallel to the sliding direction of the magnetic recording medium, in which FIG. 28(a) shows a case in which the magnetic metal films are inclined in the reverse direction to the direction of inclination of the magnetic gap and FIG. 28(b) shows a case in which the magnetic metal films are inclined in the same direction as the direction of inclination of the magnetic gap.

EMBODIMENTS

Figure 1:
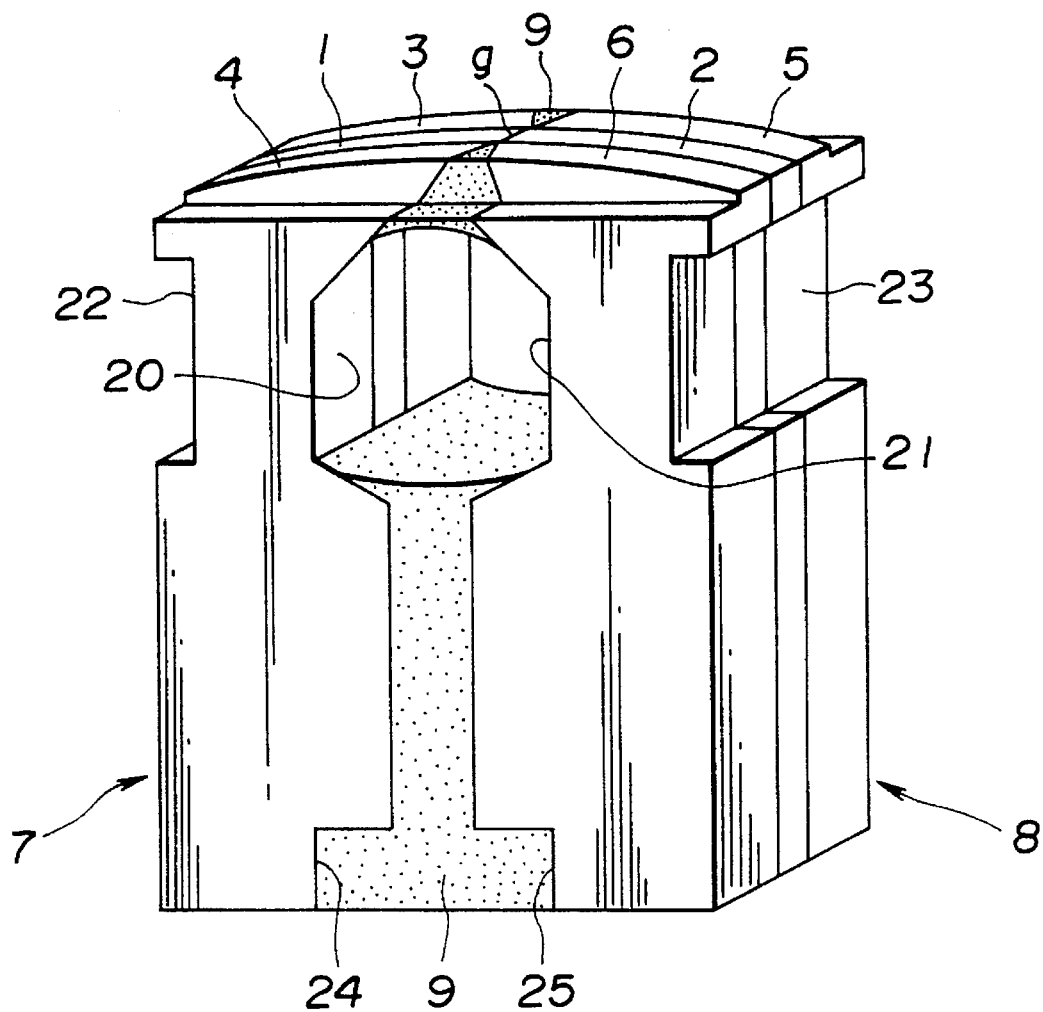
FIG. 1 is a perspective view of a magnetic head according to the present invention.

Referring to the drawings, preferred embodiments of the present invention will be explained in detail.

The magnetic head according to the present invention is made up of a pair of magnetic core halves 7, 8, in which magnetic metal films 1 and 2 are sandwiched by pairs of ferrite substrates 3, 4 and 5, 6 along the direction of the film thickness and in which the magnetic core halves 7 and 8 are fused to each other via a fusion glass 9 for defining a magnetic gap g between the end faces of the magnetic metal films 1 and 2 abutted to each other, as shown in FIG. 1.

Figure 2:
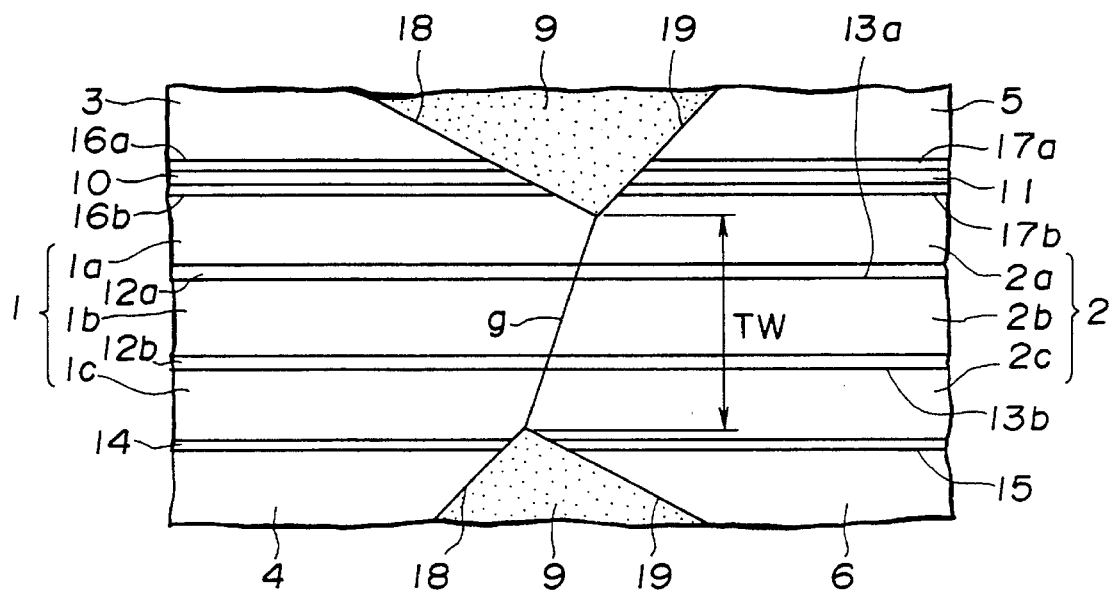
FIG. 2 is an enlarged schematic plan view showing a magnetic gap portion of the magnetic head according to the present invention.
Figure 3:
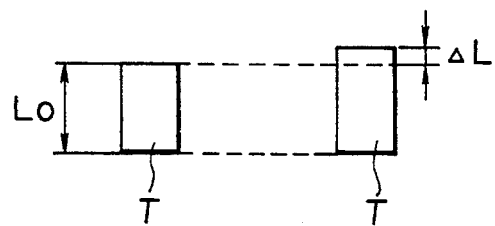
FIG. 3 is a schematic view for illustrating the glass elongation ratio.
Figure 4:
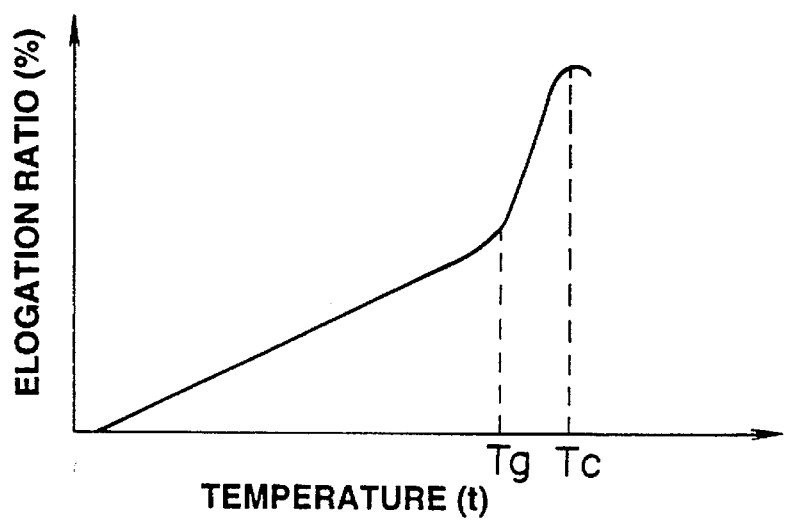
FIG. 4 is a graph showing a thermal expansion curve of glass.
Figure 5:
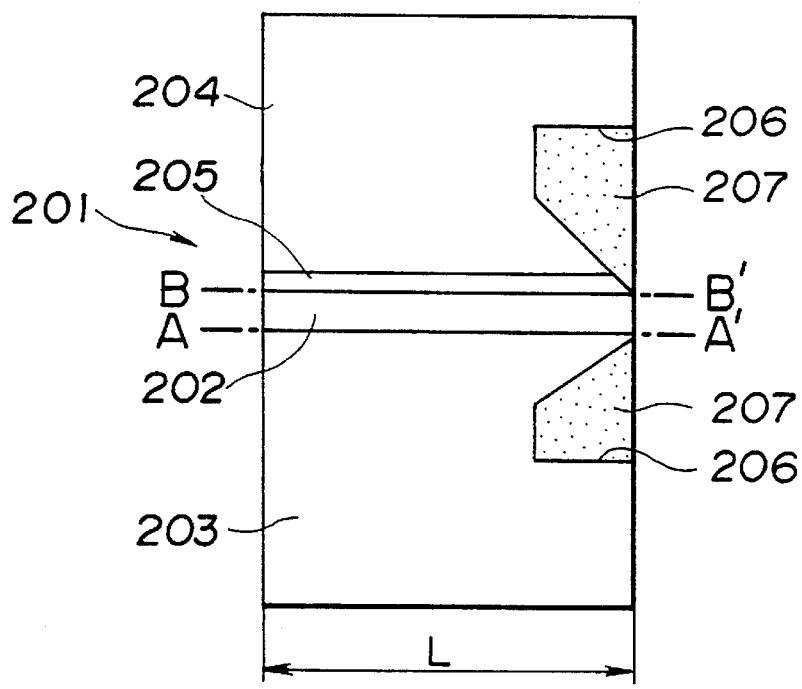
FIG. 5 is an enlarged schematic plan view for illustrating the occurrence of cracking in the fusion glass.
Figure 6:
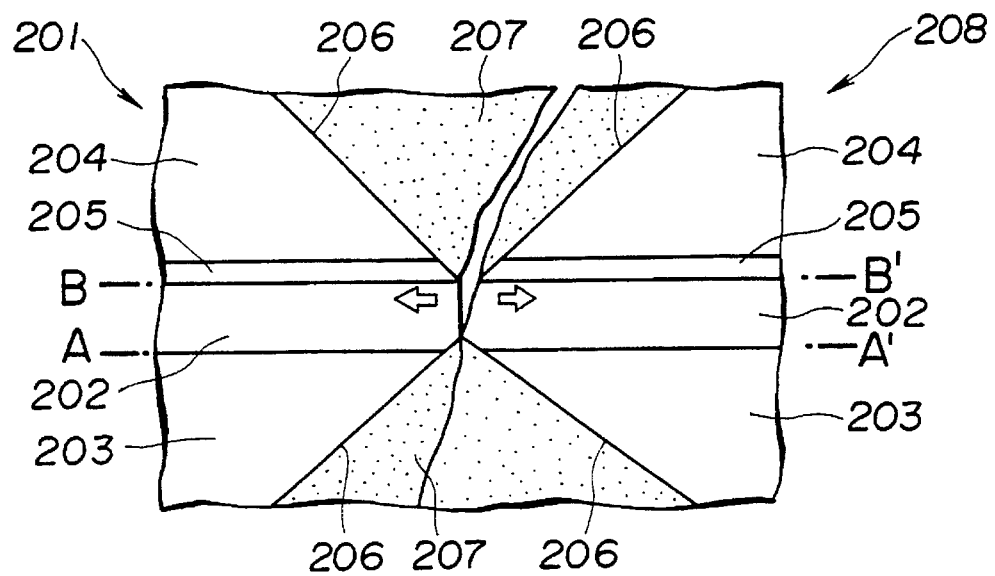
FIG. 6 is an enlarged schematic plan view showing the cracking in the fusion glass.

The magnetic core halves 7 and 8 are each formed by the magnetic metal films 1, 2 and the pairs of ferrite substrates 3, 4, 5, 6, with the ferrite substrates 3, 5 being bonded via lamination glass films 10, 11 to the magnetic metal films 1, 2 deposited on one of the major surfaces of the ferrite substrates 4, 6, for sandwiching the magnetic metal films between the ferrite substrates, as shown in FIG. 2 showing the sliding surface for the magnetic recording medium to an enlarged scale.

For improving high-frequency characteristics of the magnetic head, the magnetic metal films 1 and 2 are of a laminated metal film structure comprising thin magnetic metal films 1a, 1b and 1c and 2a, 2b and 2c, laminated one on the other with interposition of insulating films 12a, 12b and 12c and 13a, 13b and 13c in-between, respectively. Also, for improving the bonding power of the magnetic metal films 1 and 2 with respect to the ferrite substrates 4 and 6, the magnetic metal films 1 and 2 are deposited via underlying layers 14, 15 on the deposition surfaces of the ferrite substrates 4, 6, respectively.

Each of the thin magnetic metal films 1a, 1b and 1c and 2a, 2b and 2c may be formed of a crystalline magnetic metal material composed of sendust (Fe—Al—Si) or Fe—Ru—Ga—Si, optionally admixed with O or N, or an Fe— or Co-based micro-crystalline magnetic metal material. Since the fusion glass excellent in strength, weatherability or abrasion resistance is employed as the fusion glass 9 employed for gap bonding, the thin film formed of the crystalline magnetic metal material or the microcrystalline magnetic metal material is most preferred. The film thickness is preferably 2 to 5 μm per each thin film.

For the underlying layers 14 and 15, films of oxides, such as $SiO_2$ or $Ta_2O_5$, films of nitrides, such as $Si_3N_5$, films of metals, such as Cr, Al, Si, Pt or Ti or alloys thereof, alone or in lamination. In the present embodiment, a thin film of $SiO_2$ having a film thickness of 50 nm is employed.

The glass films 10, 11 are formed of low melting glass employed for bonding the ferrite substrate 3, 4 and 5, 6 together, and are deposited on the ferrite substrates 3, 4 and 5, 6. For these glass films 10 and 11, sputtered glass films formed by sputtering or frit glass films formed by spin coating may be employed. In the present embodiment, sputtered glass films 0.1 to 0.5 μm in thickness are employed.

Interfacing films 16b, 17b are provided between the glass films 10, 11 and the magnetic metal films 1a, 2a for preventing the reaction from occurring between the glass films and the magnetic metal films. Also, interfacing films 16a and 17a, formed of high-melting non-magnetic metal films or oxide materials are provided between the glass films 10 and 11 and the ferrite substrates 3 and 5 for preventing deterioration in strength of the ferrite caused by the reaction between the ferrite and the glass or generation of bubbles in the glass films during heating for laminating the ferrite substrates.

As these interfacing films 16a, 16b and 17a, 17b, oxides films, such as $SiO_2$, $Ta_2O_5$, $Cr_2O_3$, $TiO_2$, $ZrO_2$ or $Al_2O_3$, nitride films, such as $Si_3N_4$, films of metals, such as Cr, Ti, Zr or Ta, or alloys thereof, alone or in lamination. In the present embodiment, Cr films each having a thickness of 0.1 μm, are employed.

Since the laminated metal film head is significantly inferior in wetablity with respect to glass to the non-magnetic materials, such as ceramics or crystal glass or oxide magnetic materials, such as ferrite, an interfacing film having excellent wettability with respect to the glass is generally provided in an interface between the metal film and the glass, as taught by JP Patent KOKAI Publications Nos. 61-80511 (1986), 4-255902 (1992) and 4-324104 (1992). Examples of these interfacing materials include various oxides such as $Al_2O_3$, and $SiO_2$.

However, if ferrite is employed in the substrate, and the interfacing film is provided only between the metal film and the glass, as conventionally, the ferrite strength is lowered due to the reaction between the ferrite and the glass during the heating intended for laminating the ferrite substrates, thus leading to fracture from the inner part of the ferrite in the course of various machining operations subsequent to the lamination of the substrates. Besides, bubbles in the glass films tend to be generated in the glass films due to the reaction between the ferrite and the glass and the powder worn off from the magnetic recording medium, such as the magnetic tape, is deposited in the air bubbles to incur problems such as the clogging of the magnetic heads. In the present embodiment, interfacing films 16a, 17a are also provided between the ferrite substrates 3, 5 and the glass films 10, 11 for inhibiting the inconveniences resulting from the reaction between the ferrite and the glass.

The magnetic core halves 7 and 8 are formed with track width adjustment grooves 18, 19 by partially cutting away both ends along the direction of the film thicknesses of the thin magnetic metal films 1 and 2 presenting abutment surfaces for adjusting the track width TW of the magnetic gap g playing the role of a recording/playback gap.

On the other hand, winding grooves 20, 21 for allowing the placement of coils, not shown, are formed halfway in the abutment surfaces as substantially U-shaped grooves. For improving the placement of the coils, auxiliary winding grooves 22, 23 are also formed as substantially U-shaped shallow slots on the portions of the lateral surfaces of the magnetic core halves 7, 8 in register with the winding grooves 20, 21. For increasing the bonding strength of the magnetic core halves 7, 8, glass grooves 24, 25 are formed at the rear end edges of the magnetic core halves 7, 8 opposite to the magnetic gap g.

The above-described magnetic core halves 7, 8 are abutted to each other at the end faces of the magnetic metal films 1, 2 presenting the abutment surfaces via a gap film, not shown, and bonded to each other by the fusion glass 9 for defining the magnetic gap g playing the role of the recording/playback gap between the abutting surface of the magnetic metal films 1 and 2.

With the magnetic head made up of these magnetic core halves 7, 8, since a closed magnetic circuit is completed by the magnetic metal films 1 and 2 and the ferrite substrates 3, 4, 5 and 6, the cross-sectional area of the core may be maintained so that the magnetic head efficiency may be prevented from being lowered to enable high-density magnetic recording even if the track width TW of the magnetic gap g is reduced to, for example, 15 μm or less. Besides, with such magnetic head, the fusion glass 9 is inserted into each of the track width adjustment grooves 18, 19 formed in the magnetic core halves 7, 8, so that impingement against the magnetic recording medium may be maintained by the fusion glass 9.

Above all, for preventing the occurrence of cracks in the fused glass 9 employed for insertion into the track width adjustment grooves with the present magnetic head, the glass transition point Tg of the glass films 10, 11 employed for laminating the ferrite substrates 3, 4, 5 and 6 and the glass yield point Tc of the fused glass 9 are defined in the following manner.

That is, the glass transition point Tg of the glass films 10, 11 is selected to be higher than the glass yield point Tc of the fusion glass 9. In this manner, the glass of the glass films 10, 11 is completely solidified before starting of the solidification of the fusion glass 9 by the above-described mechanism to enable the movement of the thin magnetic metal film 1a, 2a contacted with the glass films 10, 11 to be controlled by the ferrite substrates 3 and 5 to prevent cracking from occurring in the fused glass 9.

Besides, preventing cracking from being developed in the ferrite substrates 4, 6 during lamination of the substrates and enabling the gap bonding to be achieved without cracking in the fused glass 9 by the use of the highly reliable fusion glass 9, the glass transition point Tg of the glass films 10, 11 employed for substrate lamination and the glass yield point Tc are defined in the following manner.

That is, the glass transition point Tg of the glass films 10, 11 are selected to be 450° C. or more, and the glass yield point Tc are selected to be 650° C. or less. In this manner, cracking is not produced in the ferrite substrates 4 and 6, while the highly reliable fusion glass 9 may be employed without cracking.

It should be noted that the maximum temperature that may be applied during substrate lamination is 700° C. at which deterioration in the magnetic properties of the magnetic metal films 1 and 2 is not produced. Consequently, the upper limit of the glass yield point Tc for substrate lamination is set to 650° C. which is lower than the above maximum temperature. For temperatures higher than 650° C., cracking is produced in the ferrite substrates 4, 6 during substrate lamination. On the other hand, if the glass temperature Tg is not higher than 450° C., the fusion glass 9 undergoes cracking if the highly reliable fusion glass 9 is employed during gap bonding.

Besides, for inhibiting erosion of the magnetic metal films 1 and 2 by the fusion glass 9 employed for gap bonding and diminishing the decrease of the track width TW, the viscosity of the fusion glass 9 and the viscosity of the glass during fusion are defined in the following manner.

That is, for an arbitrary temperature within a temperature range of the fusion glass 9 of not lower than 500° C. and not higher than 600° C., the viscosity of the glass corresponds to not lower than $10^3$ or to not higher than $10^4$ Pa.s, while the viscosity of the fusion glass 9 during fusion is not lower than $10_4$ Pa.s. Since the upper limit of the temperature during glass charging with the use of the crystalline magnetic metal film or the micro-crystalline magnetic metal film as the magnetic metal films 1 and 2 is 700° C. for preventing the magnetic properties of the magnetic films from being deteriorated due to heating, as described above, a PbO based low melting glass is employed as the fusion glass 9.

The PbO based low melting glass employed for gap fusion of the magnetic head employing the magnetic metal film has the temperature at which the glass viscosity becomes equal to $10_3$ Pa.s, commonly known as the working temperature Tw, equal to 300° to 600° C., and is employed at a viscosity of $10^3$ Pa.s to $10^4$ Pa.s for the fusing operation. The glass having the working temperature Tw not higher than 500° C. is mainly employed for a magnetic head making use of an amorphous magnetic alloy having a low thermal resistance as a metal film. Such glass is significantly inferior in strength, weatherability and abrasion resistance to the glass having the working temperature Tw of not lower than 500° C.

Figure 21:
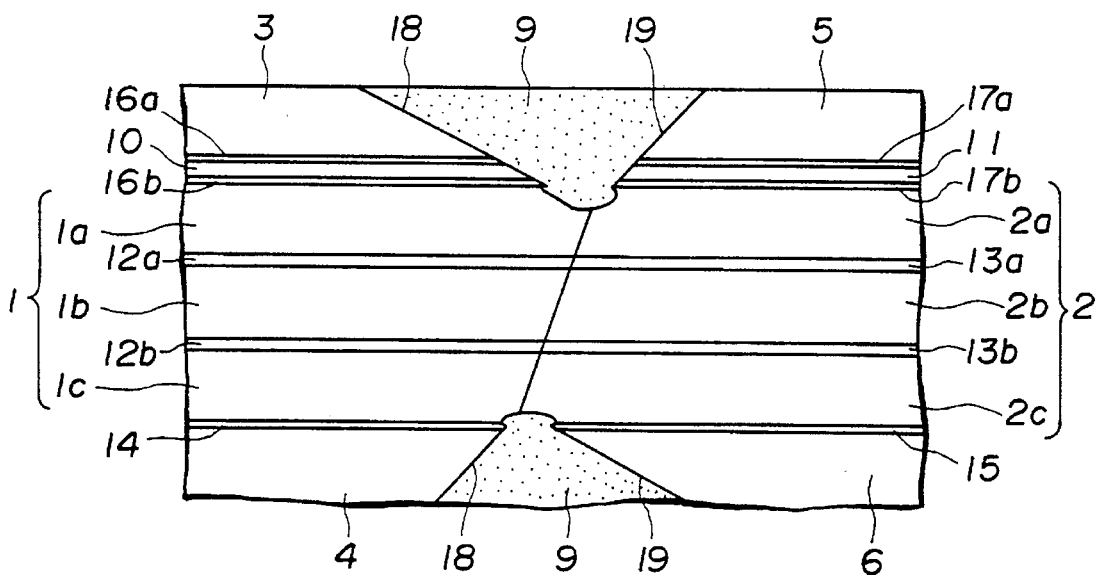
FIG. 21 is an enlarged schematic plan view showing the magnetic gap portion and also showing the erosion of the magnetic metal film by the fusion glass.

Consequently, the fusion glass employed in a magnetic head making use of the crystalline magnetic metal film or the micro-crystalline magnetic metal film having thermal resistance higher than that of the amorphous magnetic alloy preferably has the working temperature Tw of not lower than 500° C. The viscosity of the glass during glass bonding is set to not lower than $10^4$ Pa.s because the magnetic metal films 1 and 2 are eroded as shown in FIG. 21 if the glass viscosity is not higher than $10^4$ Pa.s.

On the other hand, since the upper limit of the glass yield point Tc employed in the substrate lamination is set to 650° C. for limiting the cracking of the ferrite substrate during substrate lamination, if the glass having the yield point corresponding to such upper limit is employed for substrate lamination, the glass having a temperature at which the viscosity becomes equal to $10^4$ Pa.s is 600° C. or less may be employed as the gap fusing glass without cracking in the glass.

The reason the glass transition temperature Tg or the like is defined as above is explained on the basis of the results of experiments under the above-given conditions.

First, an experiment was carried out for confirming that cracking in the fusion glass 9 may be prevented by setting the glass transition point Tg of the glass employed for substrate lamination so as to be larger than the glass yield point Tc of the fusion glass 9.
Experimental Conditions (a) The following three kinds of the glass were employed as the glass employed for substrate lamination:

glass A: Tg=400° C., Tc=440° C.

glass B: Tg=430° C., Tc=480° C.

glass C: Tg=465° C., Tc=495° C.

(b) The following three kinds of the glass were employed as the fusion glass 9:

glass D: Tg=380° C., Tc=410° C., Tw=520° C.

glass E: Tg=410° C., Tc=440° C., Tw=550° C.

glass F: Tg=420° C., Tc=450° C., Tw=580° C.

(c) Magnetic head samples were produced using various combinations of the glass (a) and glass (b) to check whether or not cracking was produced in the fusion glass 9. The results are shown in Table 1, in which 0 and ● marks indicate that cracks were and were not produced, respectively.

TABLE 1

|         | glass D | glass E | glass F |
|---------|---------|---------|---------|
| glass A | x       | x       | x       |
| glass B | O       | x       | x       |
| glass C | O       | O       | O       |

Figure 20:
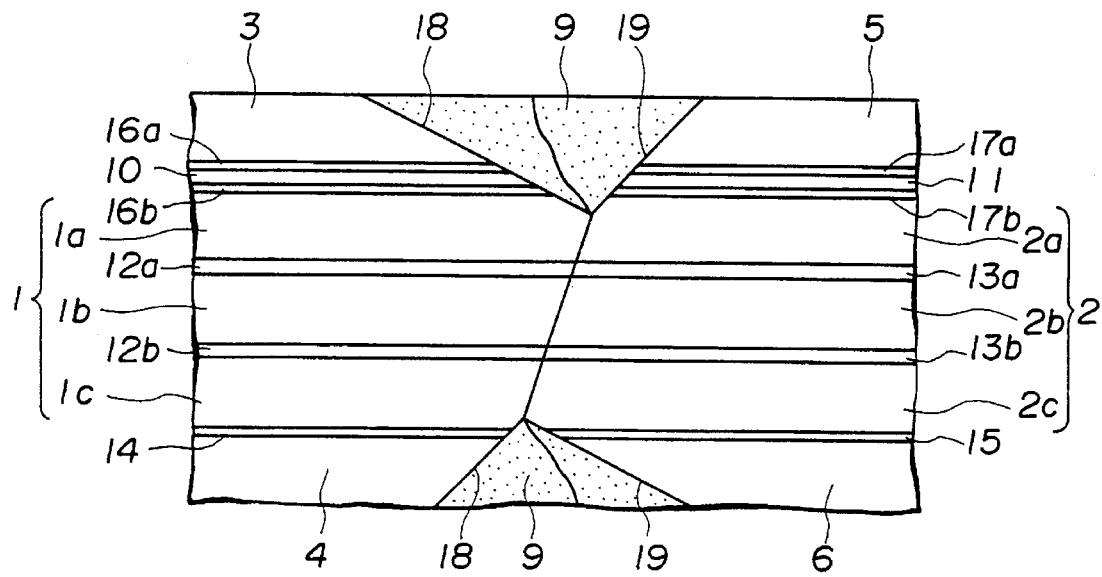
FIG. 20 is an enlarged schematic plan view showing a magnetic gap portion and also showing the occurrence of cracking in the fusion glass.

It is seen from the results of Table 1 that, if the glass transition point Tg for substrate lamination is lower than the glass yield point Tc of the fusion glass g, the fusion glass 9 undergoes cracking, as shown in FIG. 20. Conversely, if the glass transition point Tg for substrate lamination is higher than the glass yield point Tc of the fusion glass 9, no cracking produced in the fusion glass 9.

Besides, with the target gap width of 0.2 μm for the present experiment, the gap length amounted to 0.3 to 0.4 μm for all of the samples in which cracking was produced in the fusion glass 9, thus indicating gap rejects. Conversely, the gap lengths substantially equal to the target values could be obtained for the samples free of the cracking. Consequently, the gap length could be improved significantly by suppressing the generation of cracks.

Then, an experiment was carried out for confirming that cracking in the ferrite substrates 4, 6 during substrate lamination and cracking in the fused glass 9 with the use of the high reliability fusion glass during gap charging may be prevented by setting the glass transition point Tg of the glass employed for substrate lamination and the glass yield point of the fusion glass Tc so as to be higher than 460° C. and not higher than 650° C., respectively.
Experimental Conditions (a) The following three kinds of the glass were employed as the glass employed for substrate lamination:

glass A: Tg=430° C., Tc=480° C.

glass B: Tg=465° C., Tc=495° C.

glass C: Tg=580° C., Tc=650° C.

(b) The following two kinds of the glass were employed as the fusion glass 9:

glass D: Tg=410° C., Tc=440° C., Tw=550° C.

glass E: Tg=420° C., Tc=450° C., Tw=580° C.

(c) Magnetic head samples were produced using various combinations of the glass (a) and glass (b) to check whether or not cracking was produced in the ferrite substrates 4 and 6 during substrate lamination and as to whether or not cracking was produced in the fusion glass 9 during gap charging. The results are shown in Table 2.

TABLE 2

|         | glass D | glass E |
|---------|---------|---------|
| glass A | cracking in fusion glass | cracking in fusion glass |
| glass B | no particular problem | no particular problem |
| glass C | cracking in ferrite substrate | cracking in ferrite substrate |

It is seen from the above results that cracking was produced in the fusion glass 9 with the magnetic head sample employing the glass A having the glass transition temperature Tg of the glass for substrate lamination of not higher than 450° C. Conversely, with the magnetic head employing the glass B having the glass transition temperature Tg of not lower than 450° C. and the glass yield point Tc of not higher than 650° C., no cracking was observed irrespective of what fusion glass 9 was employed.

Figure 22:
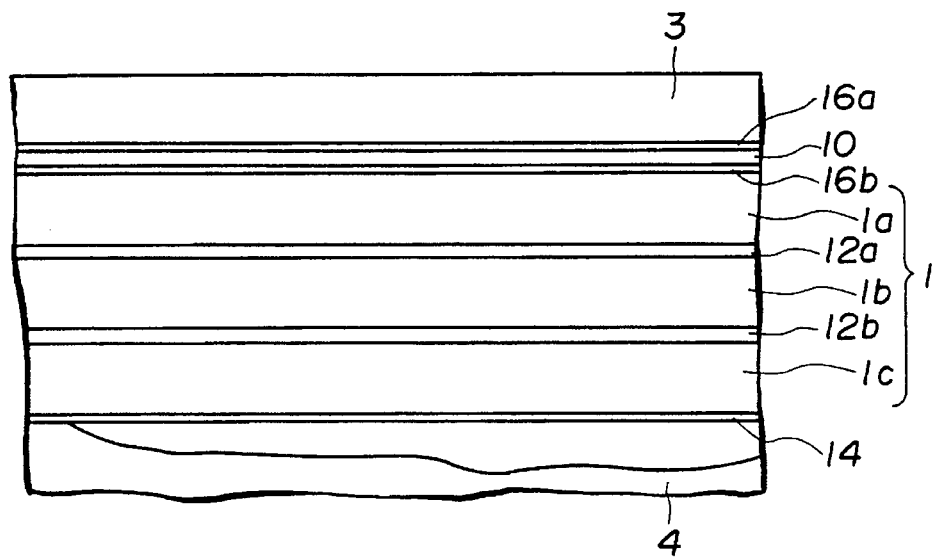
FIG. 22 is an enlarged schematic plan view showing the bonded ferrite portion and also showing the occurrence of cracking in the ferrite substrate.

With the magnetic head sample employing the glass C, having the glass yield point Tc of 650° C., the heating for substrate lamination was carried out at 700° C. It was found that cracking was produced in the ferrite substrates 4 and 6 after substrate lamination, as shown in FIG. 22, due to the excess stress generated by the differential thermal expansion coefficients between the ferrite substrates 3, 4, 5 and 6 and the magnetic metal films 1, 2.

Taking into account the fact that the thermal resistance of the magnetic metal films 1, 2 has an upper limit of 700° C. as long as the magnetic characteristics of the magnetic metal films 1 and 2 are concerned, an upper limit of the glass yield point Tc of the glass employed for substrate lamination of 650° C. may be presumed to be desirable. Consequently, by setting the glass transition temperature Tc of the glass employed for substrate lamination an the glass yield point Tc so as to be not lower than 450° C. and not higher than 650° C., it becomes possible to prevent cracking from being produced in the ferrite substrates 4, 6 during substrate lamination and to employ the high reliability fusion glass 9 for gap bonding without the risk of cracking.

Next, an experiment was carried out for confirming that the erosion of the magnetic metal films 1 and 2 by the fusion glass 9 may be prevented by defining the viscosity of the glass during charging of the fusion glass 9.

Experimental Conditions (a) The following three kinds of the PbO based low melting glass having different working points Tw were employed as the fusion glass 9:

glass A: Tg=445° C., Tc=470° C., Tw=600° C.

glass B: Tg=420° C., Tc=450° C., Tw=580° C.

glass C: Tg=380° C., Tc=410° C., Tw=520° C.

Figure 23:
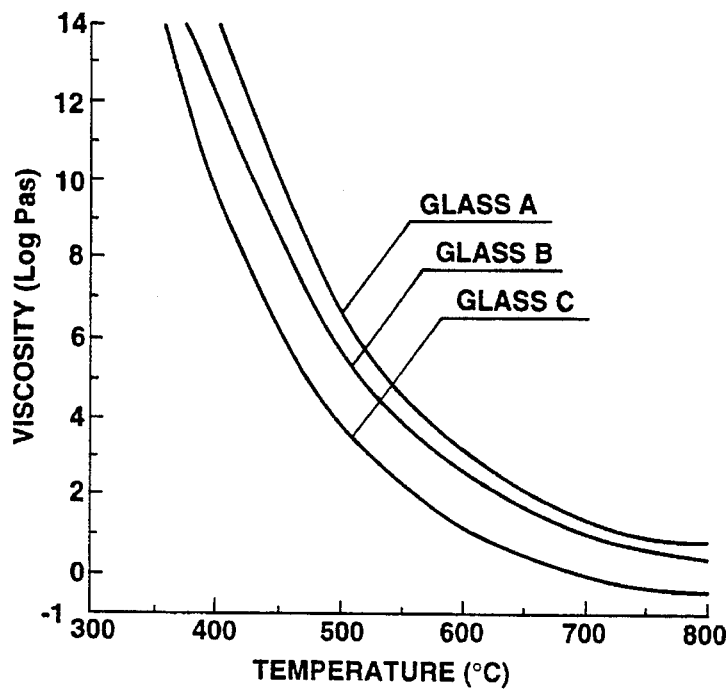
FIG. 23 is a graph showing viscosity characteristics of the glass employed for experimentation.

(b) The viscosity of the glass charged into the magnetic head is generally set to $10^3$ Pa s to $10^4$ Pa s, while the holding time at a temperature of obtaining a pre-set viscosity during charging, or a so-called settling time, is set to 60 minutes. For each of the glasses A, B and C, glass charging was carried out at the temperatures corresponding to five viscosity points a to e as found from the data of the glass viscosity characteristics shown in FIG. 23, for the settling time of 60 minutes, for producing magnetic head samples, as shown in the following Table 3:

TABLE 3

|  | glass A | glass B | glass C |
| --- | --- | --- | --- |
| viscosity a:$10^{2.5}$:Pa·S | 620° C. | 600° C. | 540° C. |
| viscosity b:$10^{3.0}$:Pa·S | 600° C. | 580° C. | 520° C. |
| viscosity c:$10^{3.5}$:Pa·S | 580° C. | 560° C. | 500° C. |
| viscosity d:$10^{4.0}$:Pa·S | 570° C. | 540° C. | 490° C. |
| viscosity e:$10^{4.5}$:Pa·S | 550° C. | 530° C. | 480° C. |

Figure 24:
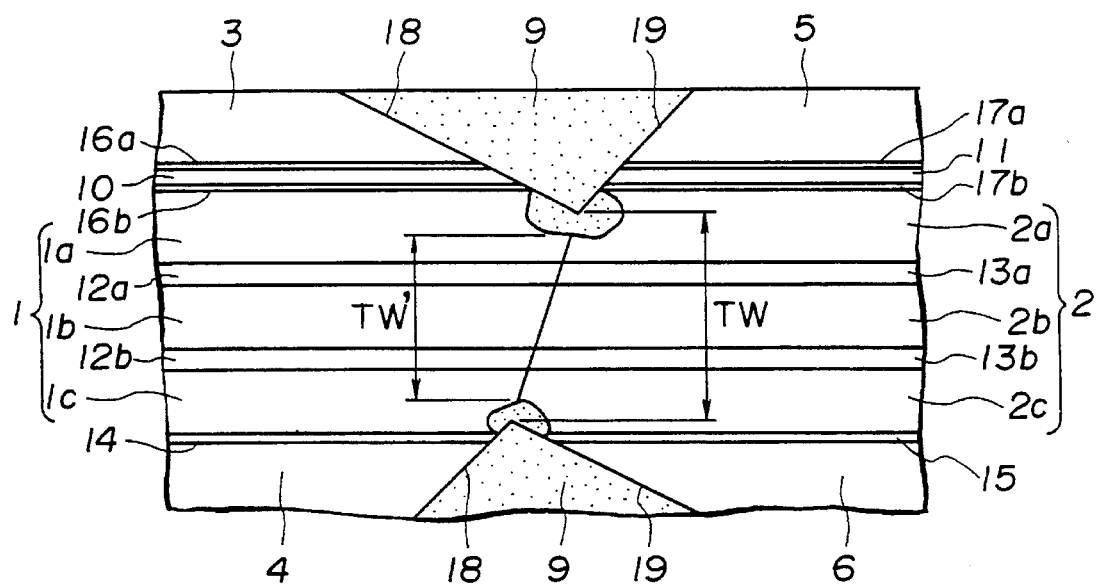
FIG. 24 is an enlarged schematic plan view showing the magnetic gap portion and also showing the decrease in the amount of the track width.
Figure 25:
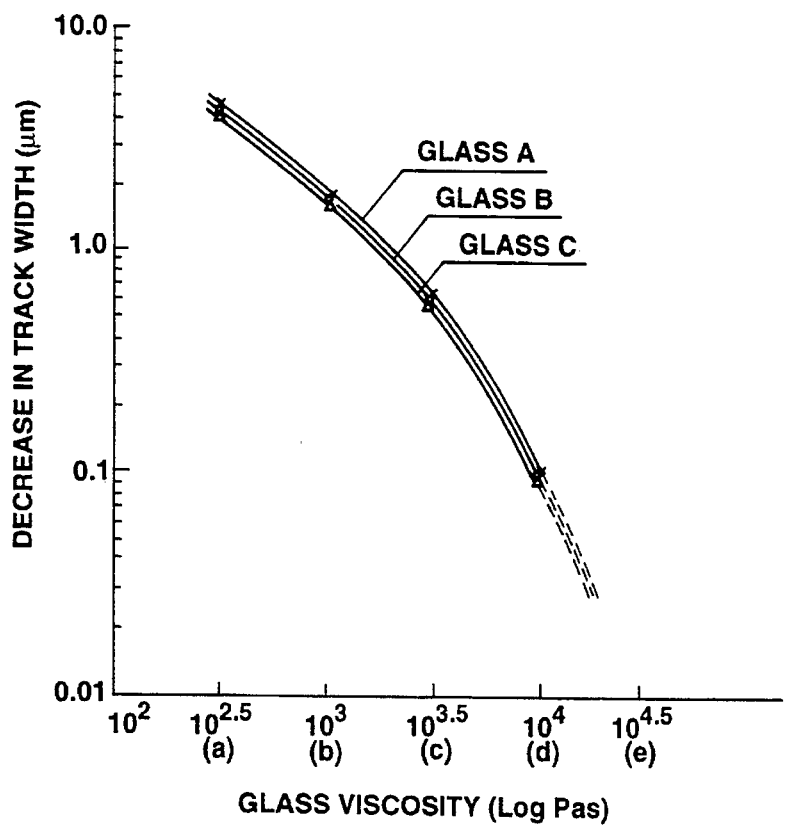
FIG. 25 is a graph showing the relation between the viscosity of the glass employed for experimentation and the decrease in the track width.

For the magnetic head samples, produced from the combinations shown in Table 3, the amount of decrease in the track width TW, incurred by the erosion of the magnetic metal films 1 and 2 by the fusion glass 9, was measured using a scanning type electron microscope. The results are shown in FIG. 25. Meanwhile, the amount of decrease in the track width TW is the track width TW before glass fusion less the track width TW' left after the erosion caused by glass fusion, as shown in FIG. 24.

It is seen from the above results that the magnitude of the decrease in the track width TW incurred by the erosion of the magnetic metal films 1 and 2 by the fusion glass 9 depends significantly on the viscosity of the glass being charged and is equal to 0.1 μm or less for any of the glasses for the viscosity of the charged glass of not less than $10^4$ Pa.s. It is also seen that the decrease in the track width TW amounts to approximately 1.5 μm at the maximum for the customary range of the glass viscosity of $10^3$ Pa.s to $10^4$ Pa.s.

Although there is no data shown in FIG. 25 for the viscosity of the glass being charged of $10^{4.5}$ Pa.s, it is because the decrease in the track width TW when charging the glass at such viscosity is nearly zero and at a practically indiscernible level.

Figure 26:
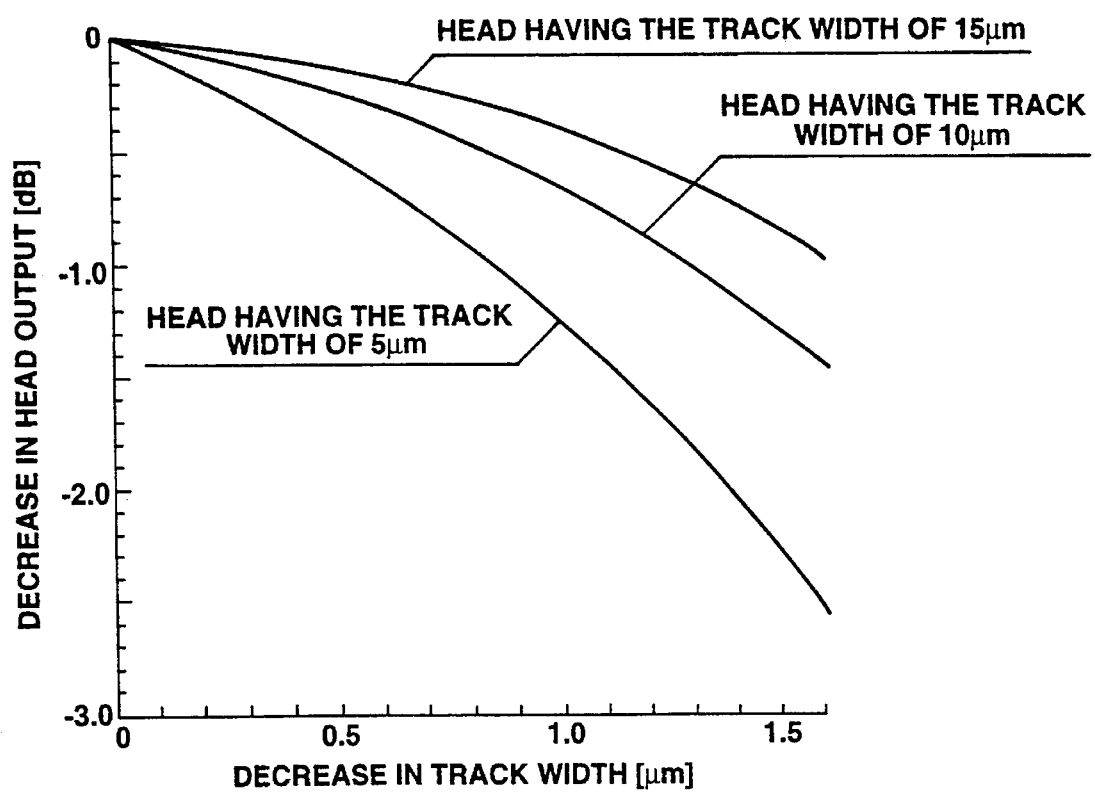
FIG. 26 is a graph showing the relation between the decrease in the track width of the magnetic head employed for experimentation and the decrease in the head output.

The relation between the decrease in the track width TW and the decrease of the head playback output is shown in FIG. 26, from which it is seen that from an decrease of the track width TW of 0.1 μm, the decrease in the playback output amounted to 0.1 dB or less for any of the heads having the track widths of 5 μm, 10 μm and 15 μm, such decrease in the playback output presenting no practical inconvenience.

It is seen from above that by charging the fusion glass 9 into the track width adjustment grooves 18, 19 at the viscosities of not lower than $10^4$ Pa.s, the decrease in the amount of the track width TW caused by the erosion of the magnetic metal films 1 and 2 by the fusion glass 9 may be suppressed to not higher than 0.1 μm, with the decrease in the playback output due to the decrease in the amount of the track width TW being not more than 0.1 dB.

Finally, an experiment was carried out for confirming that the reaction between the glass films 10, 11 and the ferrite substrates 3, 5 may be prevented by the provision of the interfacing films 16a and 17a between the glass films 10 and 11 employed for laminating the ferrite substrates and the ferrite substrates 3, 5.

Experimental Conditions (a) The following two kinds of the glass were employed as the glass employed for substrate lamination:

glass A: Tg=430° C., Tc=480° C.

glass B: Tg=465° C., Tc=495° C.

(b) A CF film 0.1 μm thick was employed as an interfacing film. (c) Magnetic head samples were prepared by the combinations of the conditions (a) and (b) and without employing the interfacing films, and checked as to whether or not fracture in the ferrite were produced and as to whether of not bubbles were produced. The results are shown i n Table 4.

TABLE 4

|  |  | fracture in ferrite | bubbles in glass |
| --- | --- | --- | --- |
| glass A | interfacing film | none | none |
|  | no interfacing film | yes | yes |
| glass B | interfacing film | none | none |
|  | no interfacing film | yes | yes |

It is seen from the above results that, with the magnetic heads provided with the interfacing films 16a and 17a between the glass films 10 and 11 and the ferrite substrates 3 and 5, fractures within the ferrite material or bubbles in the glass films we re not observed for any of the glasses A and B. Conversely, for the magnetic heads not provided with the interfacing films 16a and 17a, fractures within the ferrite material and air bubbles in the glass films were observed for both of the glasses A and B.

Meanwhile, an experiment was also carried out, using a tensile adhesion strength tester, for measuring the bonding strength subsequent to heat treatment of magnetic head samples in which a glass film was deposited on the ferrite substrate via a Cr film and magnetic head samples in which a glass film was deposited directly on the ferrite substrate.

The results of the experiment indicated that, for the samples not provided with the Cr interfacing film and the samples provided with the Cr interfacing film, the bonding strength amounted to 213.5 kgf/cm² and 749.7 kgf/cm², respectively, indicating that the samples provided with the Cr films are superior in the bonding strength. The results of the experiment also demonstrated that no fractures were caused in the glass film when the Cr film was provided, whereas fractures were caused in the ferrite material, and that such decrease in the bonding strength was caused by the reaction between the glass and the ferrite.

It is seen from above that by providing the interfacing films 16a, 17a between the glass films 10, 11 employed for the lamination of the ferrite substrates and the ferrite substrates 3 and 5, it becomes possible to prevent deterioration of the ferrite strength due to the reaction between the glass films 10 and 11 and the ferrite substrates 3 and 5 to prevent fractures beginning from the inside of the ferrite during a variety of machining operations following the lamination of the substrates. Furthermore, by providing the interfacing films 16a and 17a between the glass films 10, 11 and the ferrite substrates, it becomes possible to prevent bubbles from being produced by the reaction between the glass films 10, 11 and the ferrite substrates 3, 5 to prevent clogging of the magnetic head by the powders worn off from the magnetic recording medium, such as magnetic tape.

Figure 27:
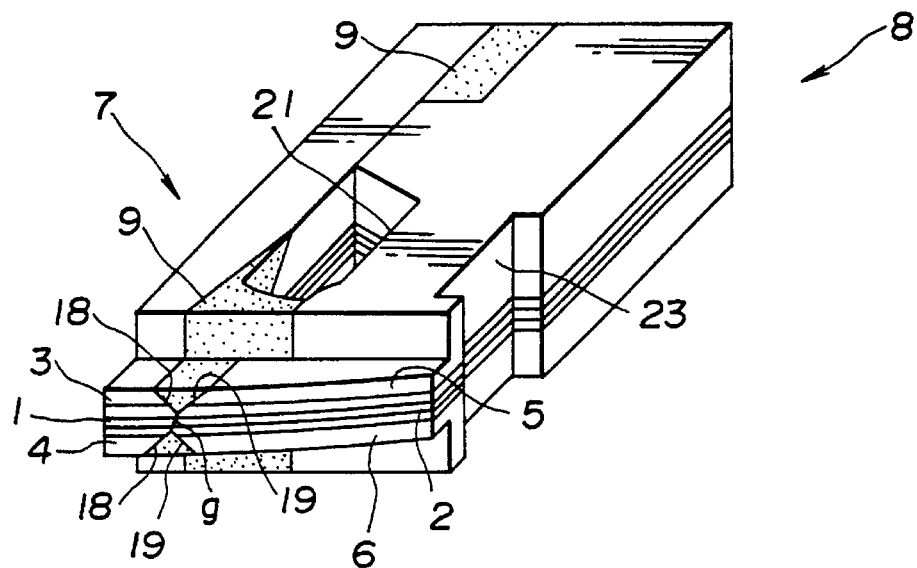
FIG. 27 is a perspective view showing a magnetic head according to a modification of the present invention.
Figure 28A:
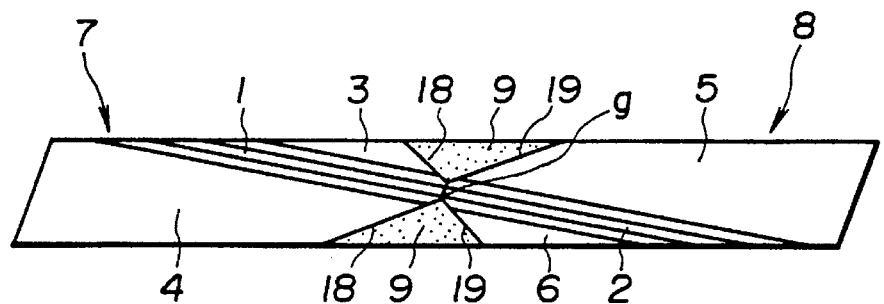
Figure 28B:
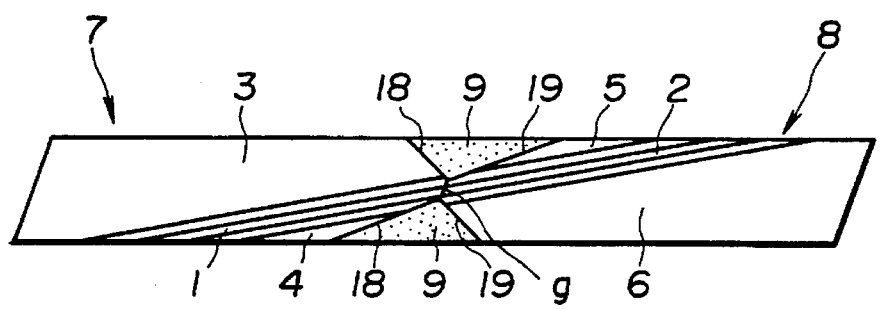
Figure 29:
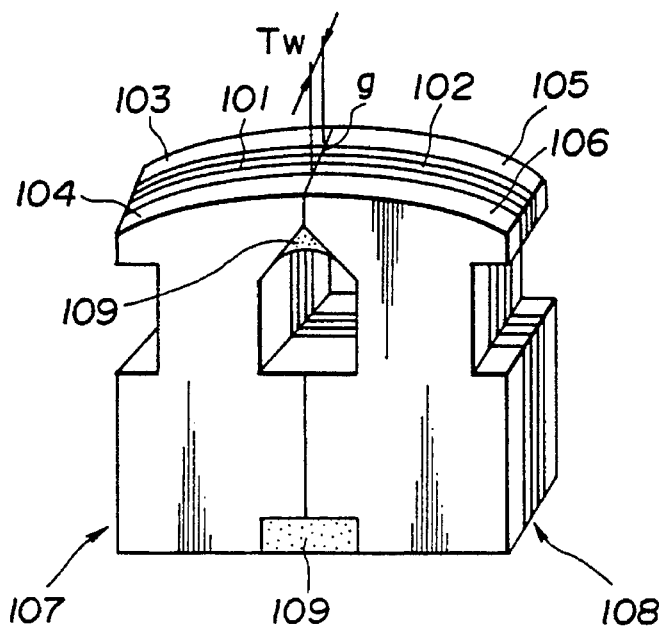
FIG. 29 is a perspective view showing a magnetic head in which a non-magnetic material is employed for a magnetic core substrate.
Figure 30:
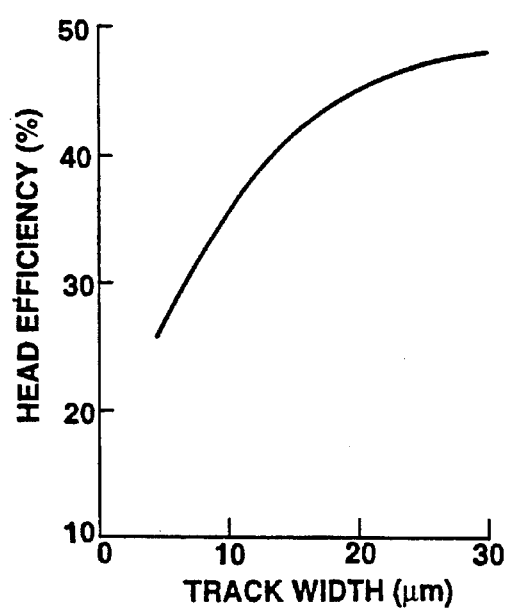
FIG. 30 is a graph showing the relation between the tack width and the head efficiency of the magnetic head in which a non-magnetic material is employed for a magnetic core substrate.
Figure 31:
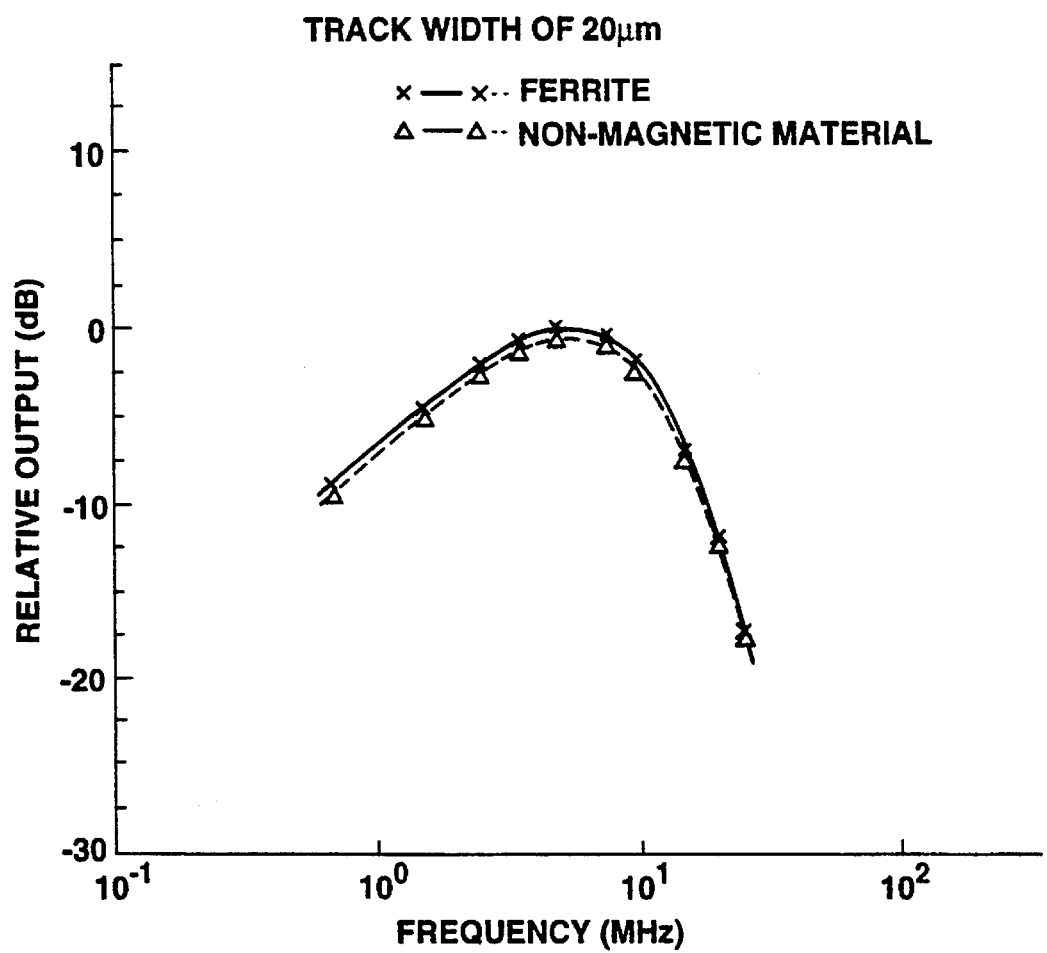
FIG. 31 is a graph showing the relation between the frequency and the relative output for the track width of 20 μm of the magnetic head employing the non-magnetic material or ferrite as the magnetic core substrate material.
Figure 32:
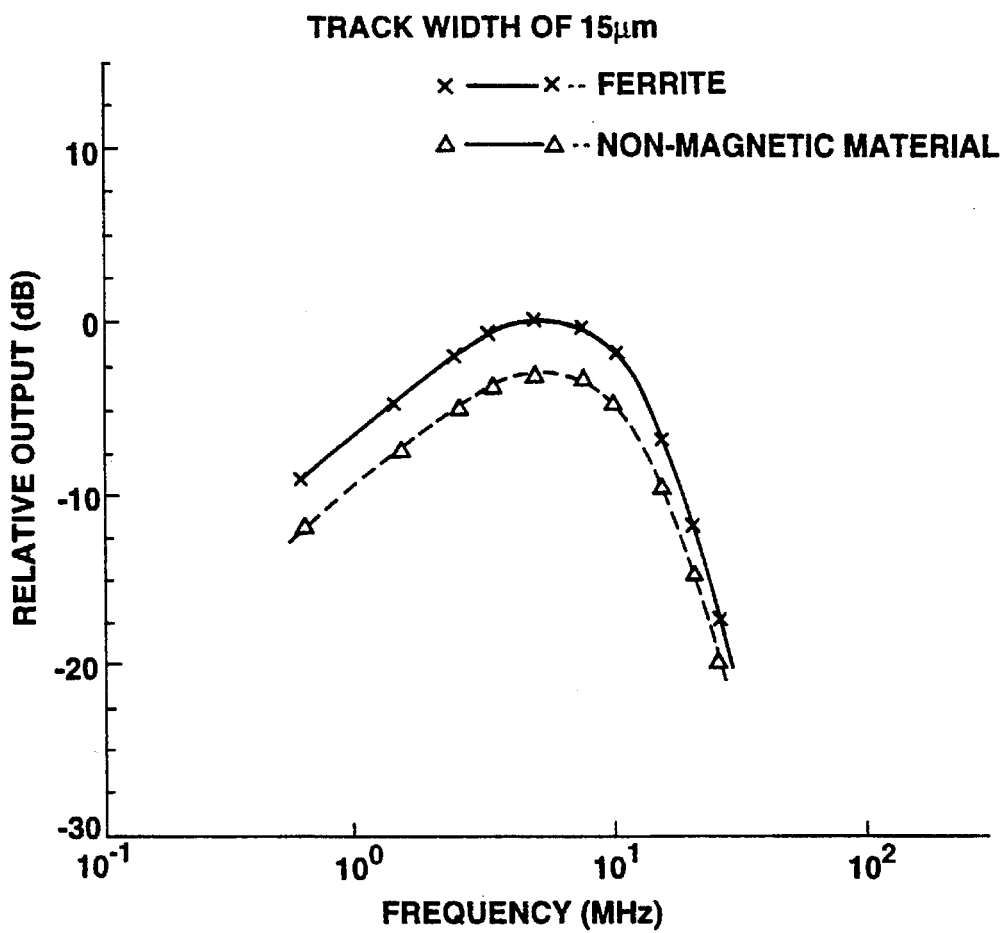
FIG. 32 is a graph showing the relation between the frequency and the relative output for the track width of 15 μm of the magnetic head employing the non-magnetic material or ferrite as the magnetic core substrate material.
Figure 33:
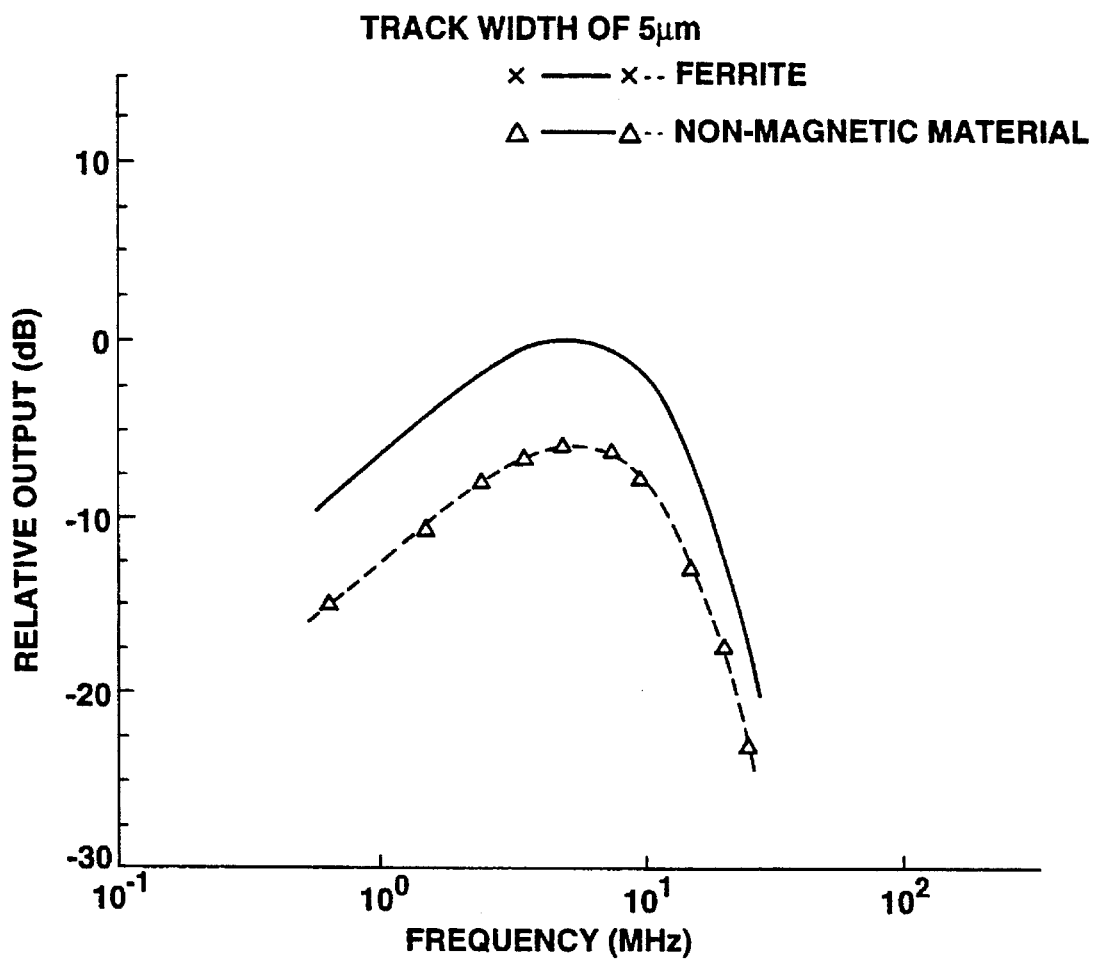
FIG. 33 is a graph showing the relation between the frequency and the relative output for the track width of 5 μm of the magnetic head employing the non-magnetic material or ferrite as the magnetic core substrate material.
Figure 34:
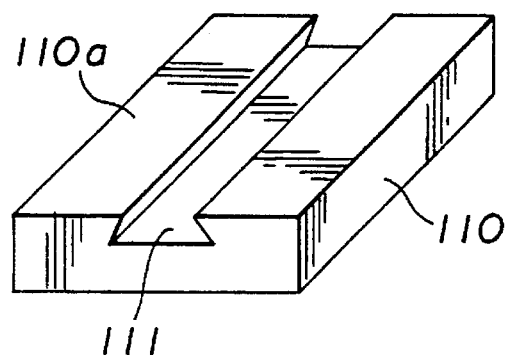
FIG. 34 is a perspective view showing the step of machining a U-shaped glass groove in a production process for a magnetic head according to a system of not forming the track width adjustment groove using a non-magnetic material as the magnetic core substrate material.
Figure 35:
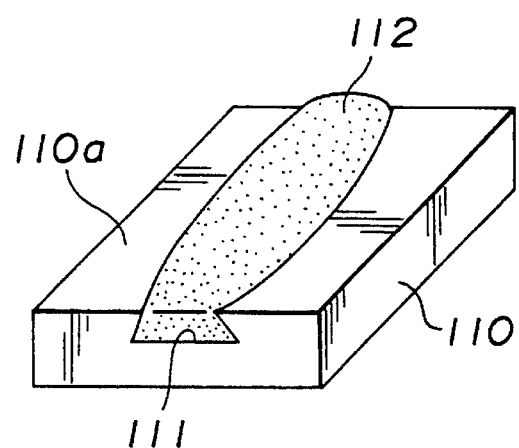
FIG. 35 is a perspective view showing the step of charging the glass in the production process for a magnetic head according to the system of not forming the track width adjustment groove using a non-magnetic material as the magnetic core substrate material.
Figure 36:
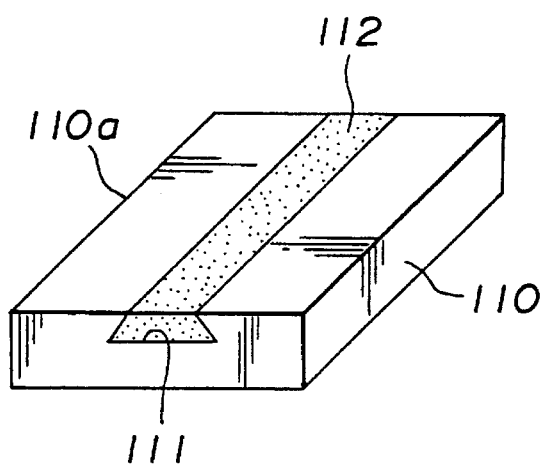
FIG. 36 is a perspective view showing the step of machining a magnetic film forming surface to a mirror surface in the production process for a magnetic head according to the system of not forming the track width adjustment groove using a non-magnetic material as the magnetic core substrate material.
Figure 37:
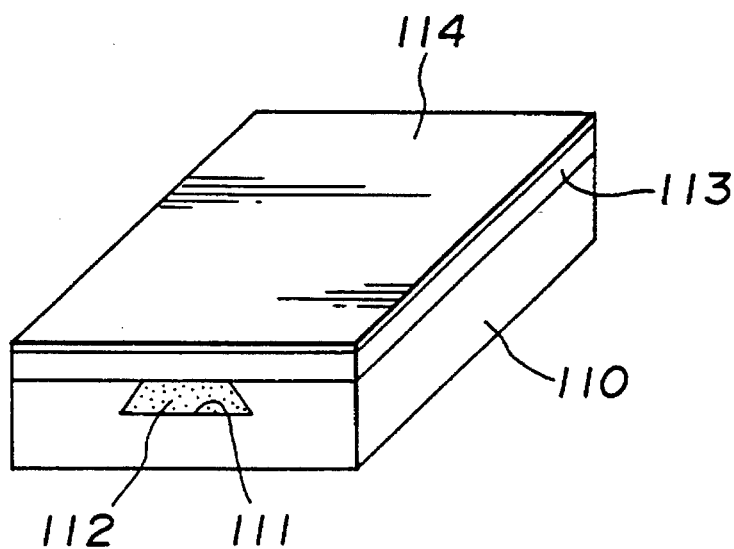
FIG. 37 is a perspective view showing the step of forming magnetic metal films and glass films in the production process for a magnetic head according to the system of not forming the track width adjustment groove using a non-magnetic material as the magnetic core substrate material.
Figure 38:
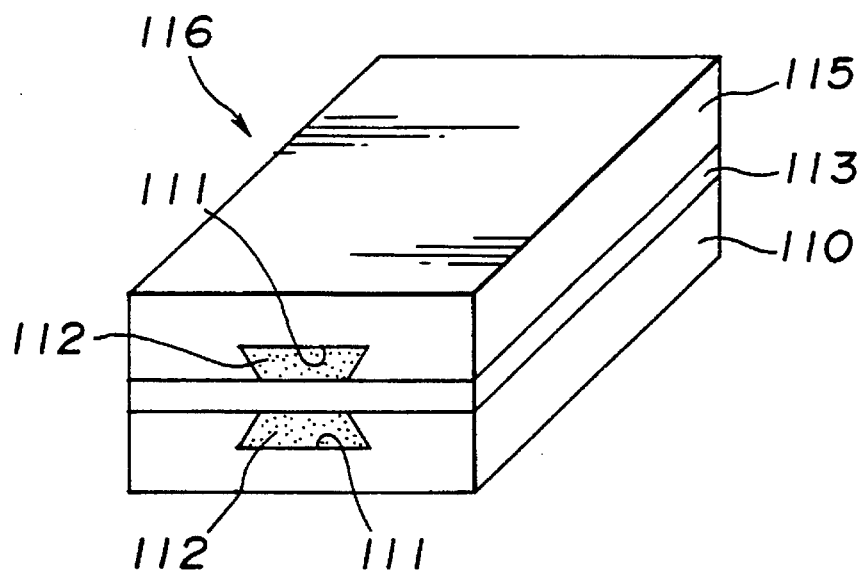
FIG. 38 is a perspective view showing the step of bonding the substrates in the production process for a magnetic head according to the system of not forming the track width adjustment groove using a non-magnetic material as the magnetic core substrate material.
Figure 39:
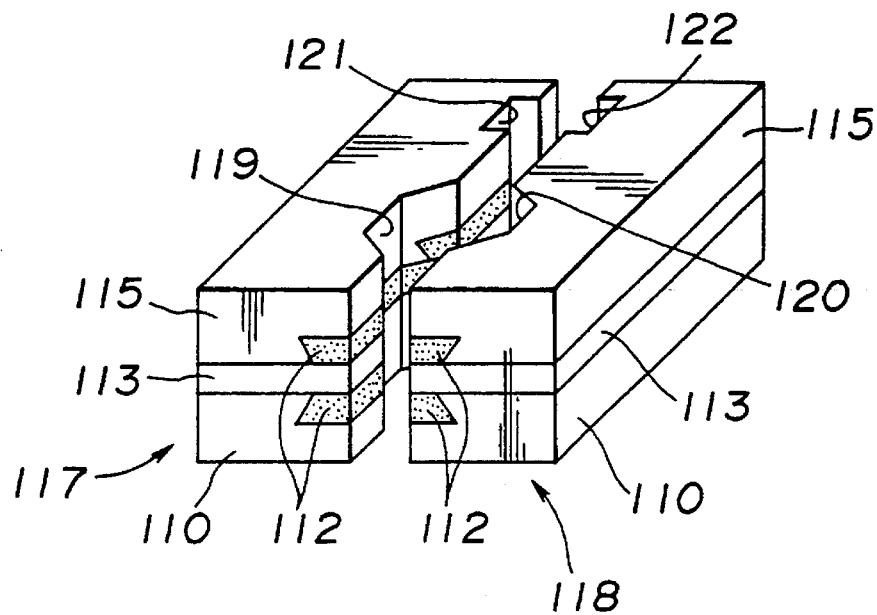
FIG. 39 is a perspective view showing steps of cutting and forming winding grooves and glass grooves in the production process for a magnetic head according to the system of not forming the track width adjustment groove using a non-magnetic material as the magnetic core substrate material.
Figure 40:
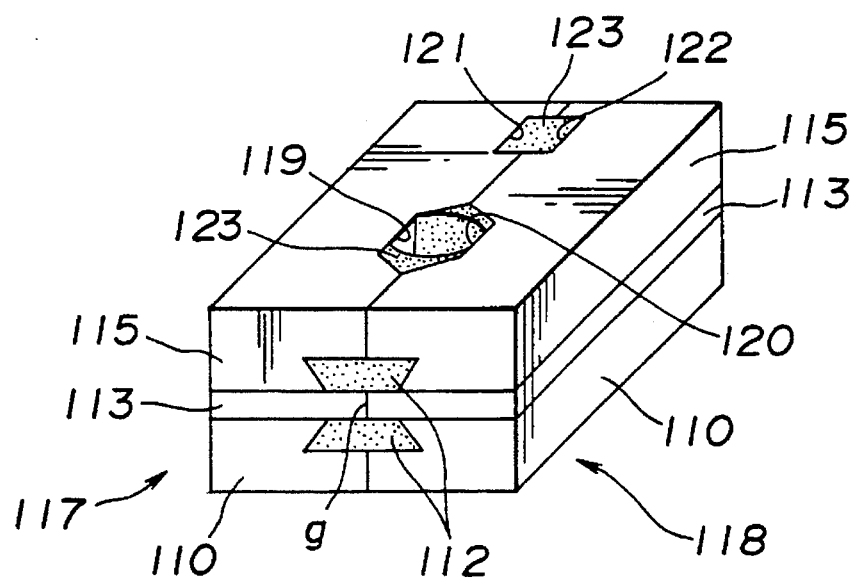
FIG. 40 is a perspective view showing the step of gap bonding in the production process for a magnetic head according to the system of not forming the track width adjustment groove using a non-magnetic material as the magnetic core substrate material.
Figure 41:
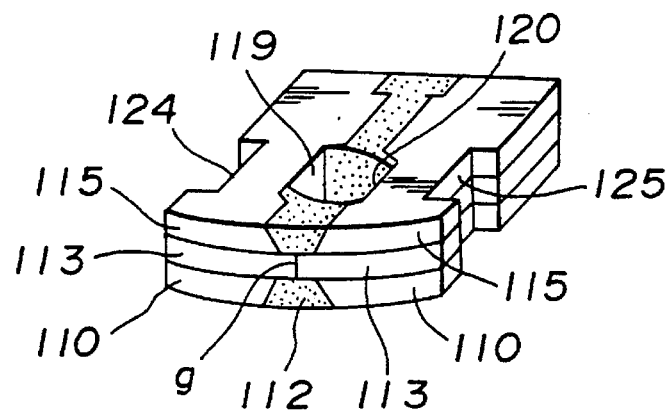
FIG. 41 is a perspective view showing the step of chip cutting in the production process for a magnetic head according to the system of not forming the track width adjustment groove using a non-magnetic material as the magnetic core substrate material.
Figure 42:
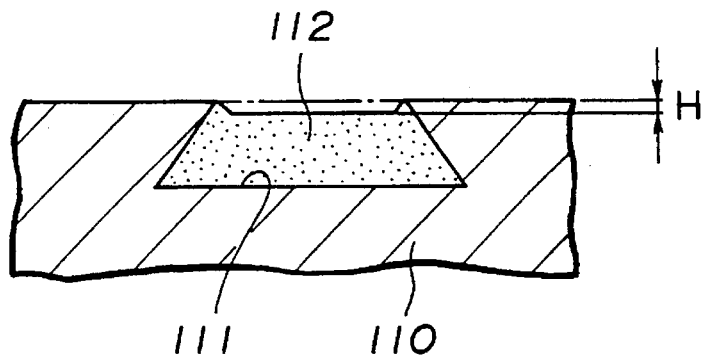
FIG. 42 is an enlarged schematic cross-sectional view showing a glass-inserted portion on machining the magnetic film forming surface to a mirror surface in the production process for a magnetic head according to the system of not forming the track width adjustment groove using a non-magnetic material as the magnetic core substrate material.
Figure 43:
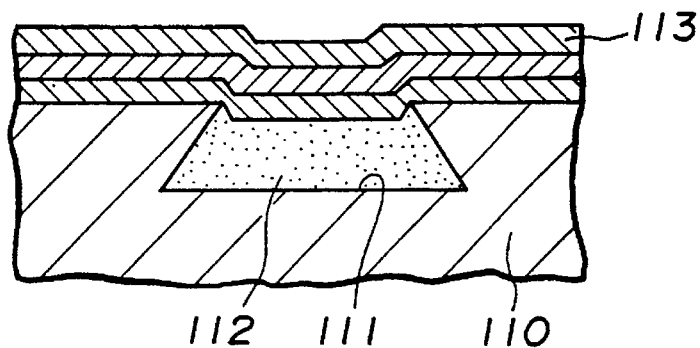
FIG. 43 is an enlarged schematic cross-sectional view showing a magnetic film forming portion to a mirror surface in the production process for a magnetic head according to the system of not forming the track width adjustment groove using a non-magnetic material as the magnetic core substrate material.
Figure 44:
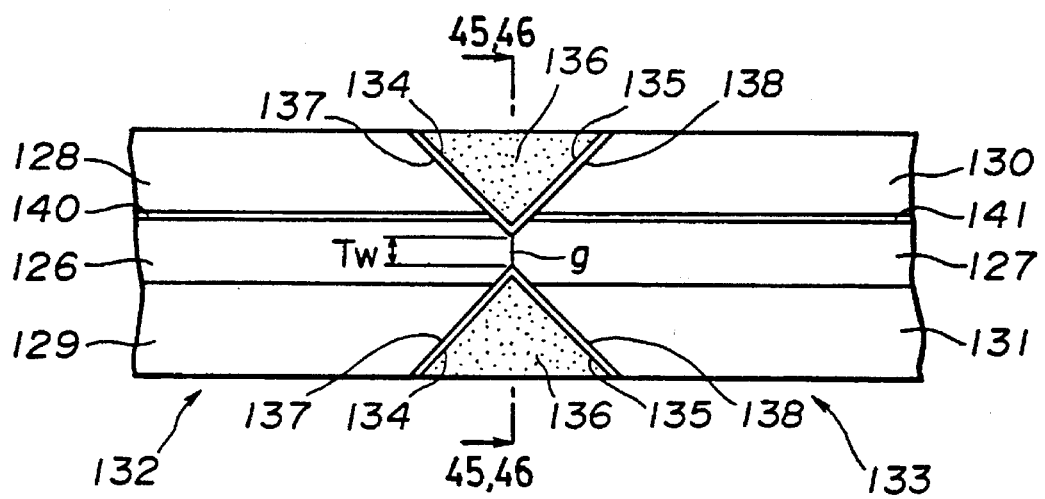
FIG. 44 is an enlarged schematic plan view showing the magnetic head in which a protective film for preventing erosion by the glass is interposed in an interface between the magnetic metal thin film and the fusion glass.
Figure 45:
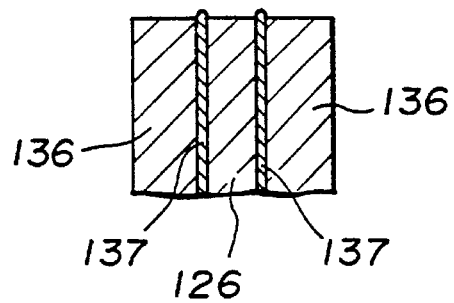
FIG. 45 is an enlarged schematic cross-sectional view showing the worn-out state of the sliding surface for the magnetic recording medium of the magnetic head in which a protective film for preventing erosion by the glass is interposed in an interface between the magnetic metal thin film and the fusion glass.
Figure 46:
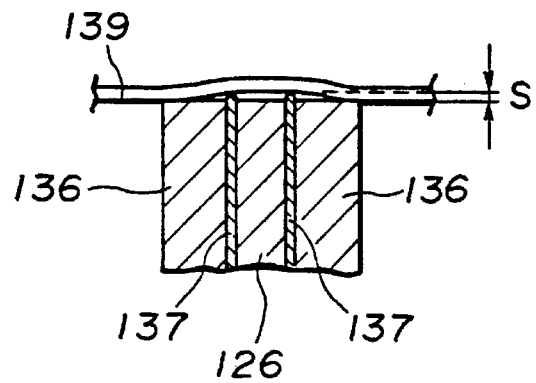
FIG. 46 is an enlarged schematic cross-sectional view showing the state of abutment by the magnetic recording medium of the magnetic head in which the protective film for preventing erosion by the glass is interposed in an interface between the magnetic metal thin film and the fusion glass.
Figure 47:
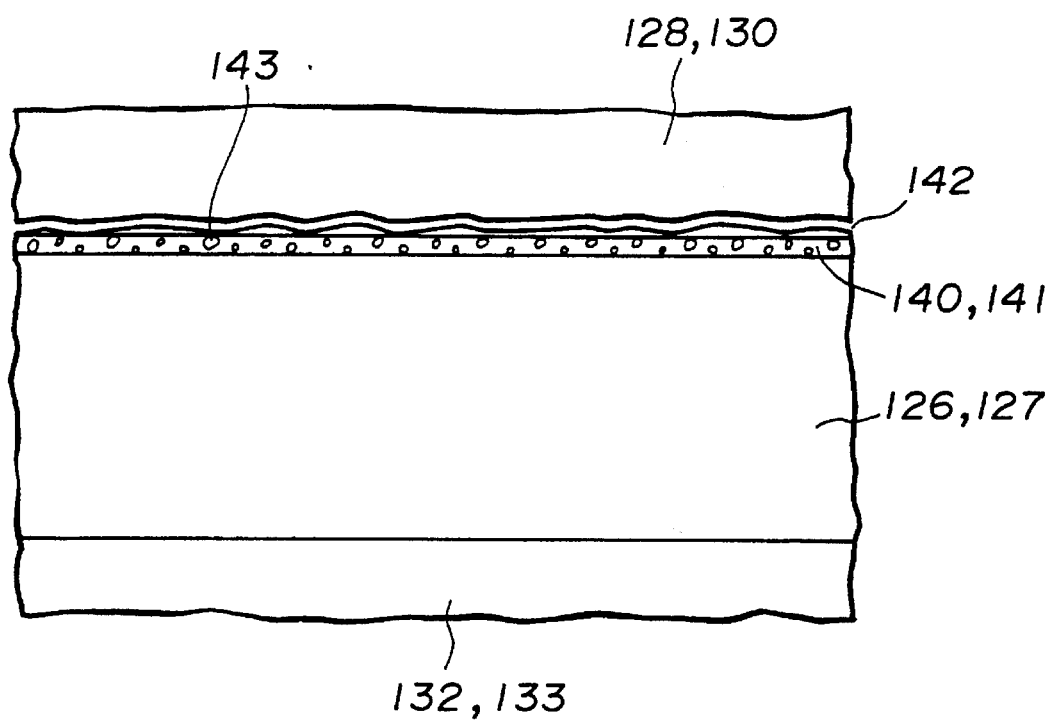
FIG. 47 is an enlarged schematic view showing the state of fracture in the ferrite material and generation of bubbles in the glass film in case the glass film is directly contacted with the ferrite substrate.

Although the track width adjustment grooves 18, 19 are formed continuously from the sliding surface to the back surface of the magnetic head in the above-described embodiment, the present invention may be applied to a magnetic head shown in FIG. 27 in which the track width adjustment grooves 18, 19 are formed only on the sliding surface for the magnetic recording medium with comparable operation and results. Besides, although the magnetic metal films 1, 2 are deposited in the above-mentioned magnetic head in a direction parallel to the sliding direction of the magnetic recording medium, the present invention may be applied to a magnetic head shown in FIGS. 28(a), 28(b) in which the magnetic metal films 1, 2 are arranged in a direction not parallel to the sliding direction of the magnetic recording medium.

The method for producing a magnetic head shown in FIG. 1 is explained step by step by referring to the drawings.

Figure 7:
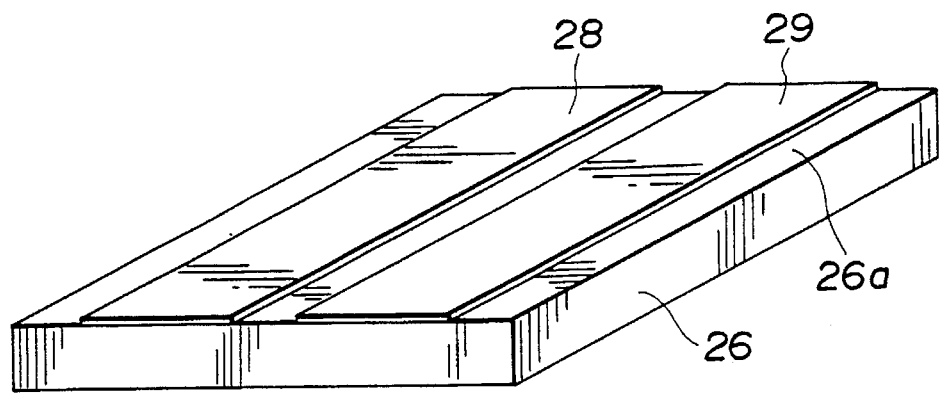
FIG. 7 is a perspective view showing a step of forming a magnetic metal film on one of the ferrite substrates in the production process for the magnetic head according to the present invention.
Figure 9:
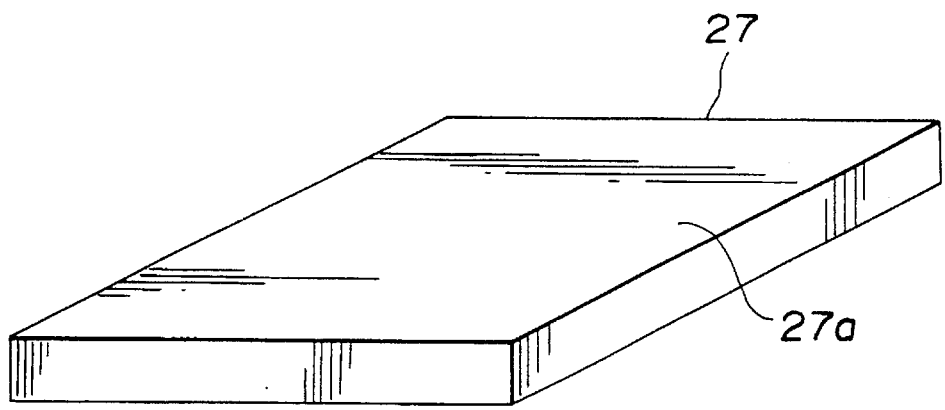
FIG. 9 is a perspective view showing the step of machining the major surface of the other ferrite substrate in the production process for the magnetic head according to the present invention.

A pair of ferrite substrates 26, 27 of the same shape as shown in FIGS. 7 and 9 are provided as magnetic core substrates and one of major surfaces 26a, 27a thereof are polished to a mirror surface.

Meanwhile, substrates formed of single crystal ferrite or polycrystal ferrite, a single crystal-polycrystal bonded substrate, or a bonded substrate formed of single crystals having different crystal orientation may be employed as the ferrite substrates 26, 27.

Then, magnetic metal films 28, 29 are formed parallel to and at a pre-set distance to each other and to a necessary minimum area on the major surface 26a of the ferrite substrate 26 by mask sputtering.

Figure 8:
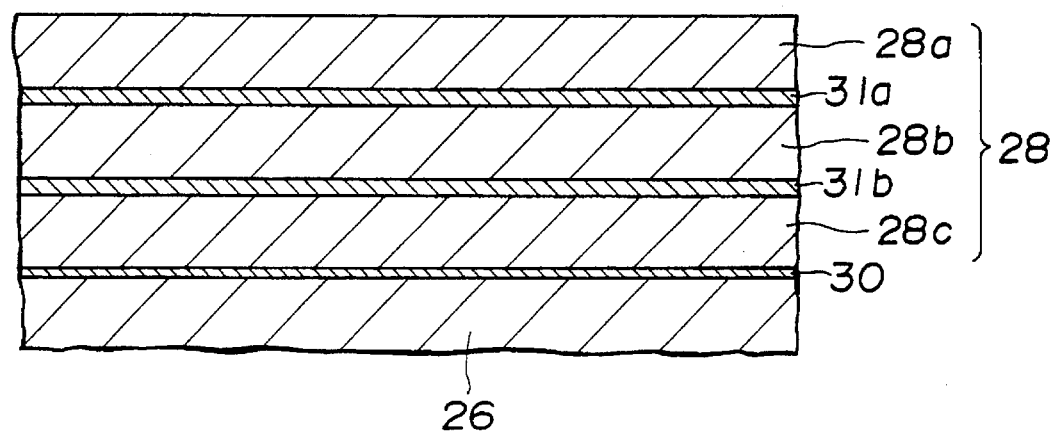
FIG. 8 is an enlarged schematic cross-sectional view showing magnetic metal films formed on one of the ferrite substrates in the production process for the magnetic head according to the present invention.

In forming the magnetic the metal films 28, 29, an underlying layer 30 of $SiO_2$ was formed to a thickness of 50 nm, as shown in FIG. 8, for improving the bonding force with the ferrite substrate 26. For improving high-frequency characteristics, the magnetic metal films 28, 29 were formed by depositing plural thin magnetic thin films 28a, 28b, 28c, 29a, 29b, 29c, via insulating films 31a, 31b, respectively.

Meanwhile, the film thickness of each of the thin magnetic metal films 28a, 28b and 28c was set to 2 to 5 μm and, for realizing a pre-set track width by the track width adjustment groove as later described, the magnetic metal thin films were stacked via the insulating films 31a and 31b to give a film thickness of the order of 1.2 to 3 times the pre-set track width.

In the present embodiment the track width is set to 5 μm, the film thickness of each of the thin magnetic metal films 28a, 28b and 28c is set to 3 μm, and the three films 28a to 28c were stacked with interposition of two insulating films 31a and 31b. Meanwhile, if the track width is set to 10 μm and 15 μm, six thin magnetic metal films were stacked with interposition of insulating films, with the thicknesses of the thin magnetic metal films and those of the insulating films being set to the same values as those for the magnetic head having the track width of 5 μm.

Figure 10:
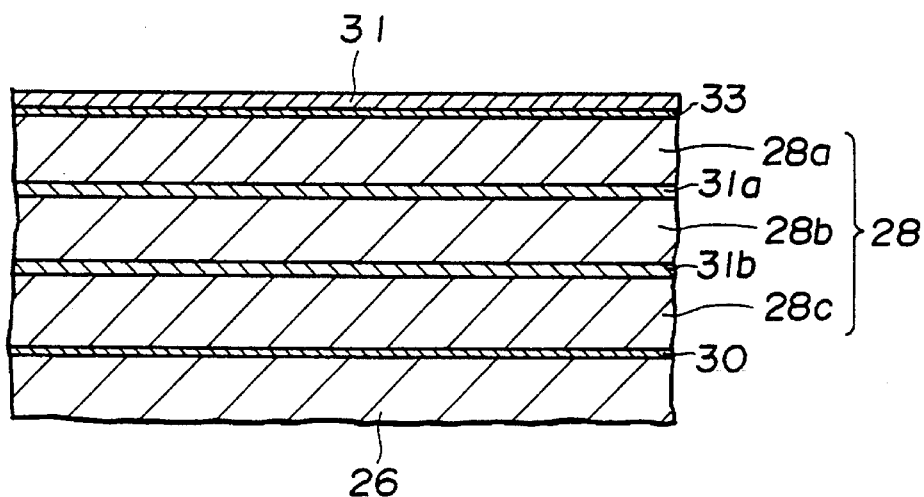
FIG. 10 is an enlarged schematic cross-sectional view showing the step of forming a glass film on the magnetic metal films in the production process for the magnetic head according to the present invention.
Figure 11:
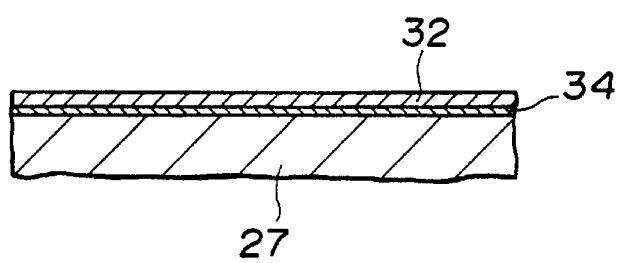
FIG. 11 is an enlarged schematic cross-sectional view showing the step of forming a glass film on the ferrite substrate in the production process for the magnetic head according to the present invention.

Then, as shown in FIGS. 10 and 11, low-melting glass films 31, 32 were formed on a thickness of 0.1 to 0.5 μm by sputtering on the magnetic metal films 28, 29 and on the major surface 27a of the ferrite substrate 27 not provided with the magnetic metal films 28, 29, respectively.

At this time, interfacing films 33, 34 were formed on the magnetic metal films 28, 29 and on the major ferrite surface 27a for preventing the reaction between the magnetic metal films 28, 29 and the ferrite on one hand and the glass on the other hand, respectively.

In the present embodiment after depositing Cr to a film thickness of 0.1 μm, a PbO glass film was stacked to a thickness of 0.2 μm. Meanwhile, the low-melting glass films 31, 32 may also be formed on only one of the ferrite substrates 26 and 27.

Figure 12:
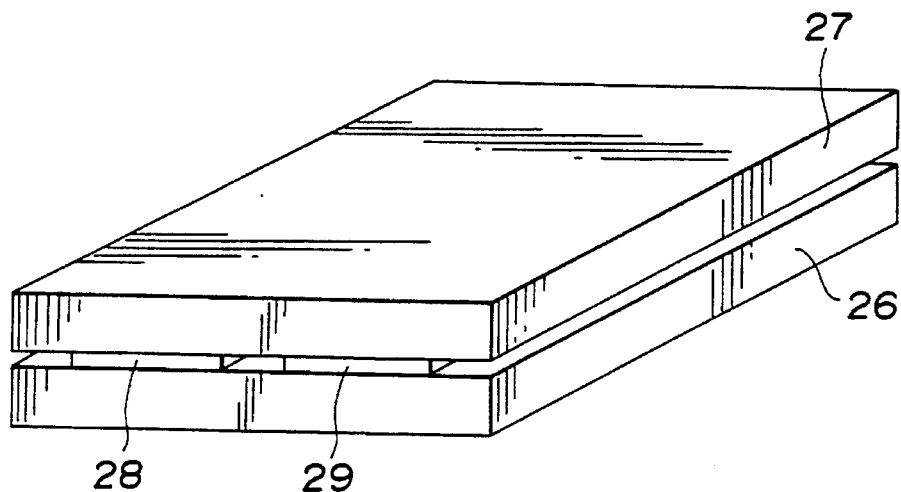
FIG. 12 is as perspective view showing the step of bonding ferrite substrates in the production process for the magnetic head according to the present invention.

Then, as shown in FIG. 12, the ferrite substrate 27 is stacked on the other ferrite substrate 26, as sandwiching the magnetic metal films 28, 29 in-between. The two substrates are pressed together under application of the heat of 500° C. to 650° C. which is insufficient to incur deterioration of the magnetic characteristics of the magnetic metal films 28, 29.

Figure 13:
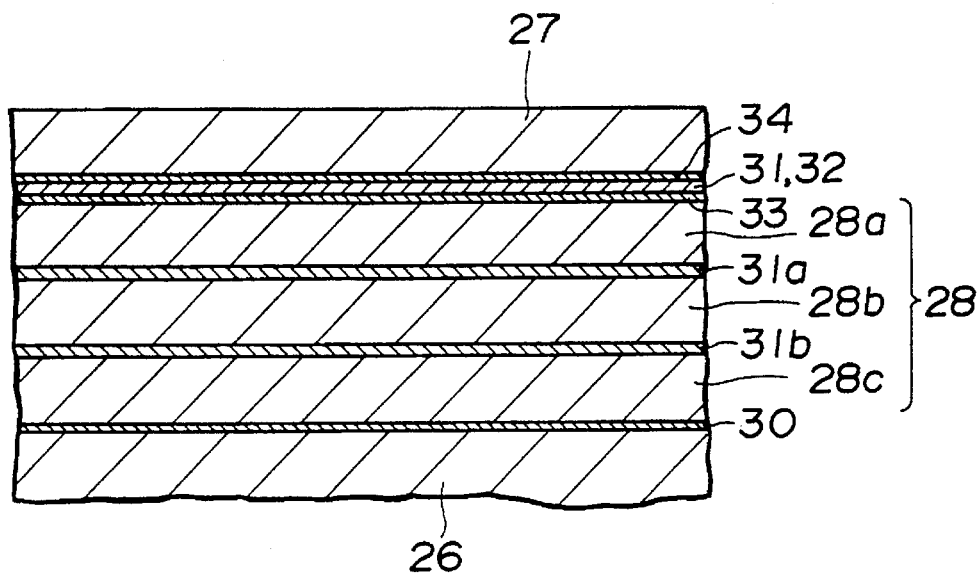
FIG. 13 is an enlarged schematic cross-sectional view showing magnetic metal films formed on the bonded ferrite substrate in the production process for the magnetic head according to the present invention.

The result is that the low-melting glass films 31, 32 are fused into each other and, on cooling, the ferrite substrates 26, 27 are bonded and unified to each other to form a bonded substrate 34, as shown in FIG. 13.

Figure 14:
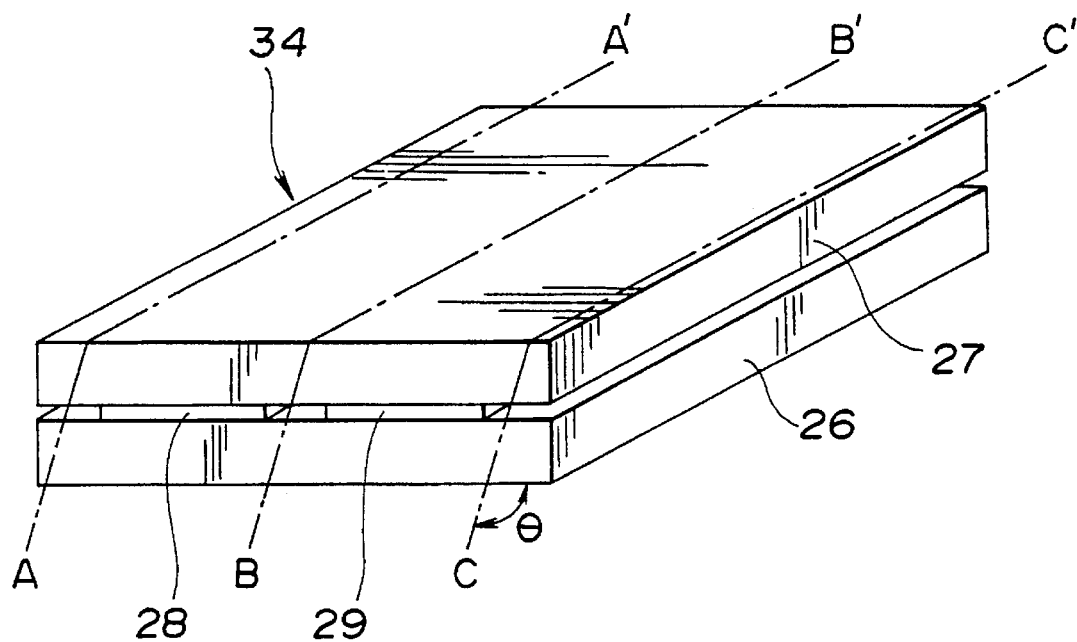
FIG. 14 is a perspective view showing the step of cutting the bonded ferrite substrate in the production process for the magnetic head according to the present invention.

The bonded substrate 34 is then segmented along lines A–A', B–B' and C–C' in FIG. 14 at an angle Θ equal to the azimuth angle of magnetic heads to be produced.

Figure 15:
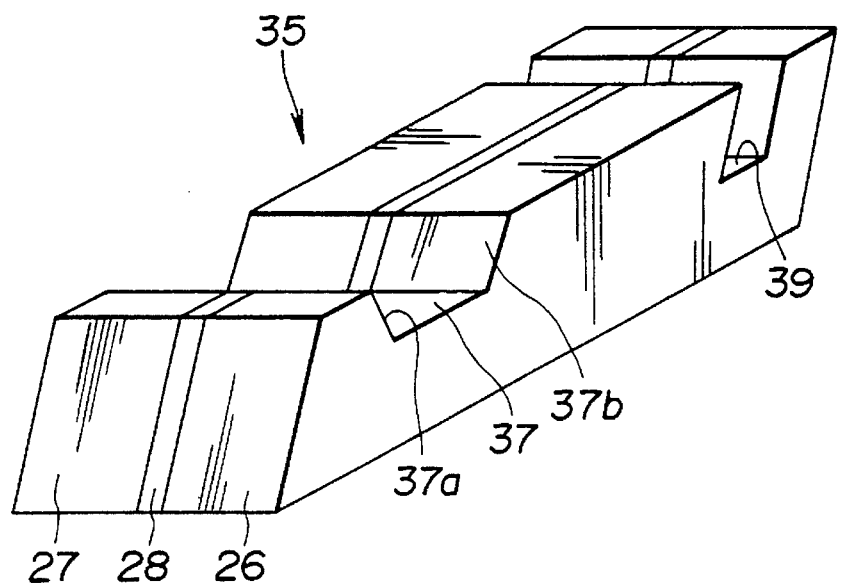
FIG. 15 is a perspective view showing the step of forming winding grooves and glass grooves in one of the magnetic core half blocks in the production process for the magnetic head according to the present invention.
Figure 16:
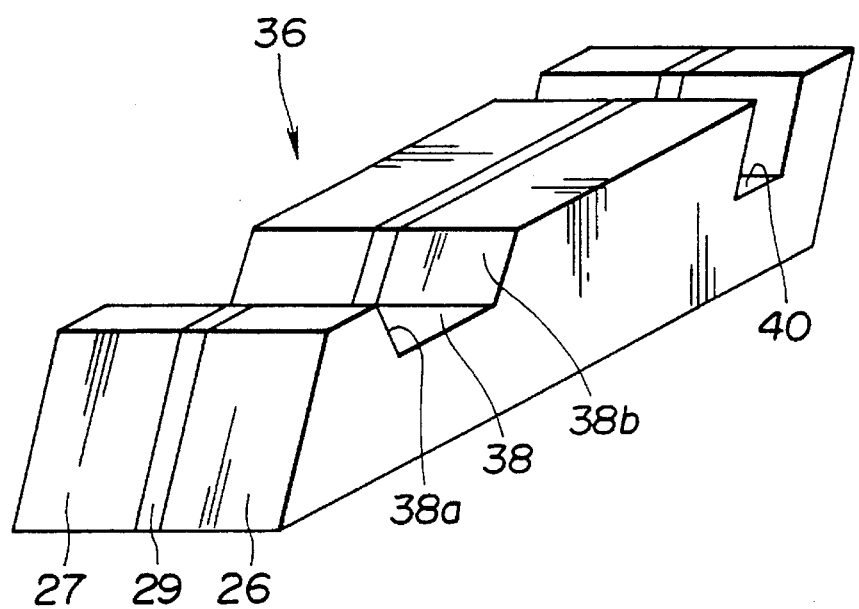
FIG. 16 is a perspective view showing the step of forming winding grooves and glass grooves in the other magnetic core half block in the production process for the magnetic head according to the present invention.
Figure 17:
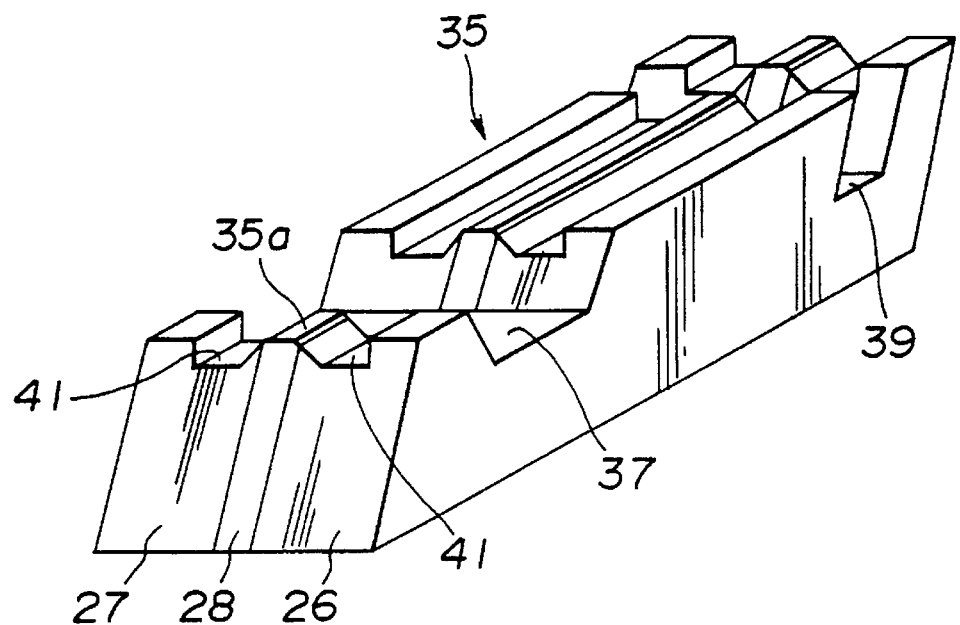
FIG. 17 is a perspective view showing the step of forming track width adjustment grooves in one of the magnetic core half blocks in the production process for the magnetic head according to the present invention.
Figure 18:
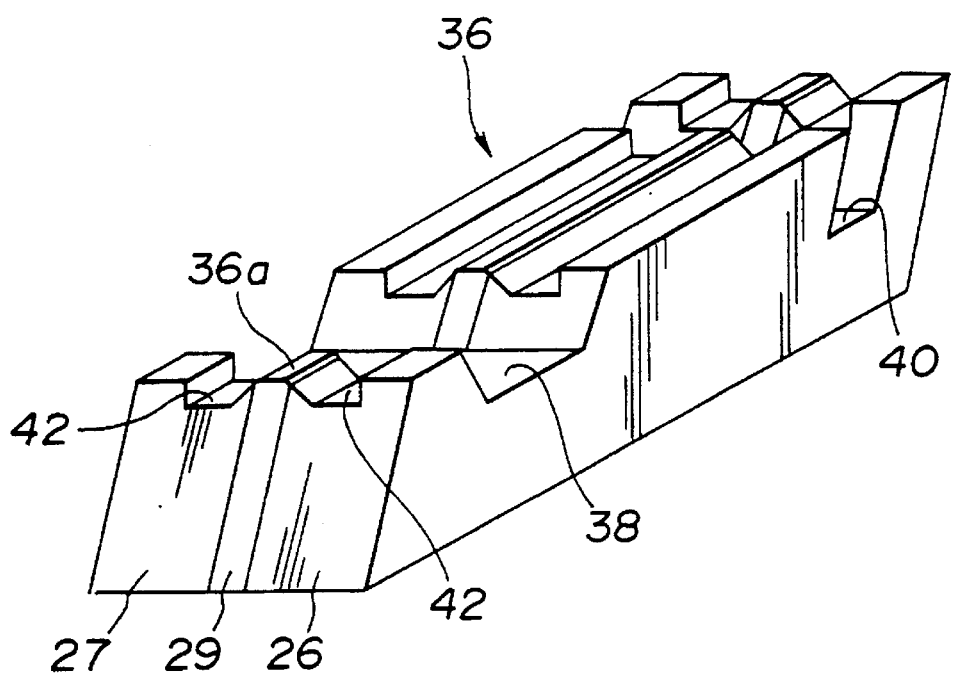
FIG. 18 is a perspective view showing the step of forming track width adjustment grooves in the other magnetic core half block in the production process for the magnetic head according to the present invention.

After removing unnecessary portions of the ferrite using a surface grinder, winding grooves 37, 38 for placement of coils and glass grooves 39, 40 for glass fusion are formed on abutment surfaces of each of the produced magnetic core half blocks 35, 36, as shown in FIGS.15 and 16.

The winding grooves 37, 38 and the glass grooves 39, 40 are each formed with a rectangular cross-section, with one of the flanks 37a, 38a of the winding grooves 37, 38 being formed as inclined surfaces.

Meanwhile, the remaining flanks 37b, 38b of the winding grooves 37, 38 may be formed as inclined surfaces or perpendicular surfaces, as desired.

Then, track width adjustment grooves 41, 42 are formed in the magnetic core half blocks 35, 36, respectively, for adjustment of the track width.

The track width adjustment grooves 41, 42 are formed throughout the entire length of the block as substantially rectangular grooves extending in a direction substantially normal to the winding grooves 37 and 38 and the glass grooves 39 and 40, as by scraping off part of both ends along the direction of the film thicknesses of the magnetic metal films 28, 29.

Then, gap forming surfaces 35a, 36a as abutment surfaces of the magnetic core half blocks 35, 36 are polished to a mirror surface.

Figure 19:
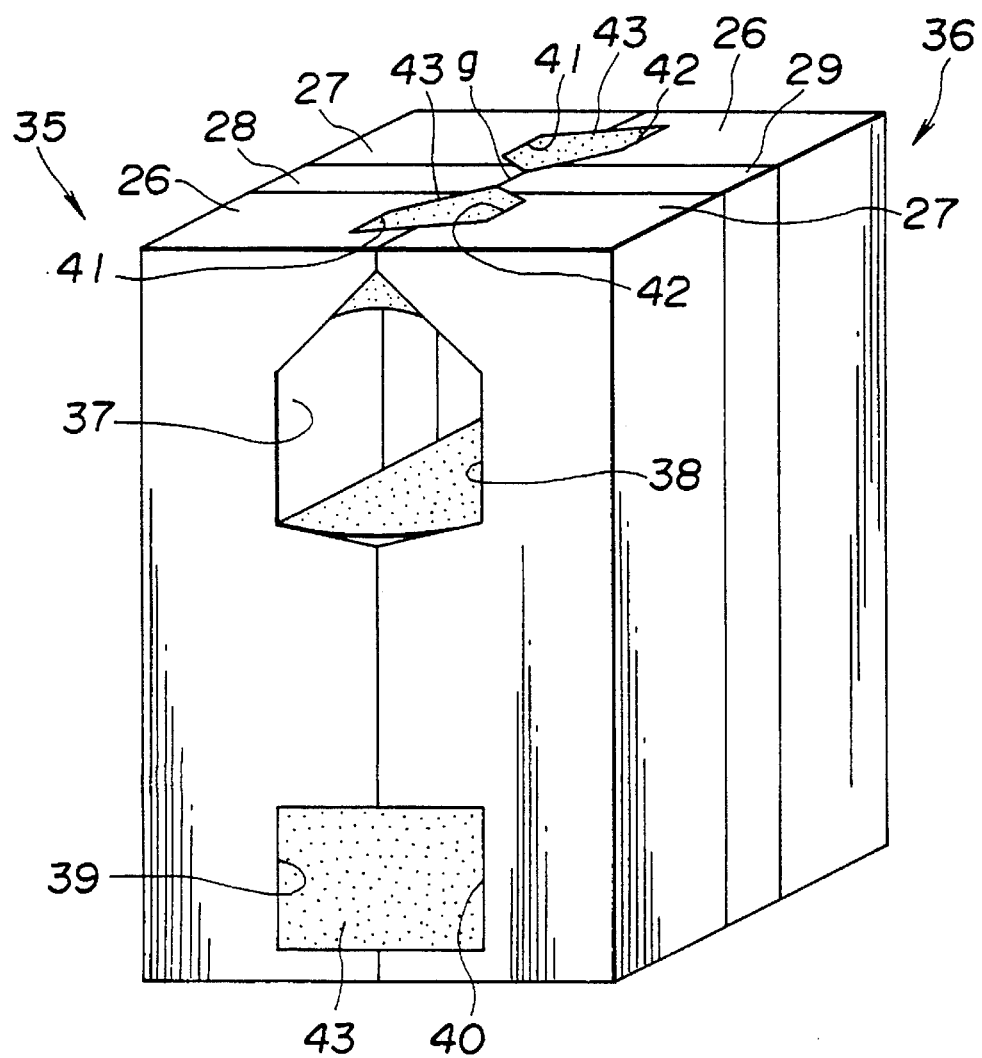
FIG. 19 is a perspective view showing the step of gap bonding in the production process for the magnetic head according to the present invention.

Then, after forming gap films on the gap forming surface 35a of the magnetic core half block 35 or on the gap forming surfaces 35a and 36a of the magnetic core half blocks, the magnetic core half blocks 35, 36 are abutted to each other with track position setting and fused glass 43 is poured into the track width adjustment grooves by way of gap bonding, as shown in FIG. 19.

The result is that the magnetic core half blocks 35, 36 are bonded to each other by the fusion glass 43 for forming a bonded ferrite block and defining a magnetic gap g playing the role of the recording/playback gap between the abutment surfaces of the magnetic metal films 28 and 29. During glass fusion, cracking is not developed in the fusion glass 43 or in the ferrite substrate 26 because the glass transition temperature Tg or the glass yield point Tc of the glass films 31, 32 for substrate lamination and the fusion glass 43 are set as described above. Besides, there is no risk of the magnetic metal films 28, 29 being eroded to decrease the track width because the viscosity of the fusion glass 43 during glass fusion is also set as described above.

Then, after forming the auxiliary winding grooves in the bonded ferrite block, the sliding surface adapted to be contacted by the magnetic recording medium is ground to a cylindrical surface and adjusted as to an abutment width. The bonded ferrite block is then cut to give a pre-set chip size.

Meanwhile, since the interfacing film 34 is provided between the ferrite substrate 27 and the glass films 31, 32 employed for stacking the ferrite substrates, there is no risk that the ferrite is lowered in strength due to the reaction between the glass films 31, 32 and the ferrite substrate 27, while there is also no risk that the fracture is developed from inside the ferrite material during various machining operations from the stage of substrate stacking up to the completion of the chip shape. Besides, since no bubbles are generated in the glass films due to the reaction between the glass films 31 and 32 and the ferrite substrate 27, there is no risk of powder debris being heaped in the bubbles or the consequent problems of magnetic head clogging.

In this manner, the magnetic head capable of satisfactorily recording/reproducing information on of from the high-density recording medium is completed, as shown in FIG. 1.

What is claimed is:

1. A magnetic head prepared by forming magnetic core half blocks and bonding said core half blocks by gap bonding using a fusion glass, each of said magnetic core half blocks being formed by stacking a ferrite substrate on another ferrite substrate having crystalline magnetic metal films laminated thereon via a glass film and having a track width adjustment groove formed in at least one of the half blocks wherein a glass transition temperature Tg of each of the glass films employed for laminating said crystalline magnetic films on said ferrite substrates is set to be higher than a glass yield point Tc of the fusion glass and further wherein a high-melting non-magnetic metal interfacing film is interposed between the glass film and the ferrite substrate.

2. A magnetic head prepared by forming magnetic core half blocks and bonding said core half blocks by gap bonding using a fusion glass, each of said magnetic core half blocks being formed by stacking a ferrite substrate on another ferrite substrate having crystalline magnetic metal films laminated thereon via a glass film and having a track width adjustment groove formed in at least one of the half blocks wherein a glass transition temperature Tg of each of the glass films employed for laminating said crystalline magnetic films on said ferrite substrates is set to be higher than a glass yield point Tc of the fusion glass and further wherein an interfacing film comprised of an oxide material is interposed between the glass film and the ferrite substrate.

\* \* \* \* \*